US011101572B2

(12) United States Patent
Bily et al.

(10) Patent No.: US 11,101,572 B2
(45) Date of Patent: Aug. 24, 2021

(54) ANTENNA ARRAY HAVING A DIFFERENT BEAM-STEERING RESOLUTION IN ONE DIMENSION THAN IN ANOTHER DIMENSION

(71) Applicant: Echodyne Corp., Kirkland, WA (US)

(72) Inventors: Adam Bily, Seattle, WA (US); Tom Driscoll, Bellevue, WA (US); John Desmond Hunt, Seattle, WA (US); Charles A. Renneberg, Seattle, WA (US); Ioannis Tzanidis, Woodinvile, WA (US); Robert Tilman Worl, Issaquah, WA (US)

(73) Assignee: Echodyne Corp., Bellevue, WA (US)

( * ) Notice: Subject to any disclaimer, the term of this patent is extended or adjusted under 35 U.S.C. 154(b) by 340 days.

(21) Appl. No.: 16/125,486

(22) Filed: Sep. 7, 2018

(65) Prior Publication Data
US 2019/0074600 A1  Mar. 7, 2019

Related U.S. Application Data

(60) Provisional application No. 62/572,043, filed on Oct. 13, 2017, provisional application No. 62/555,571, filed on Sep. 7, 2017.

(51) Int. Cl.
H01Q 21/22  (2006.01)
H04W 16/28  (2009.01)
(Continued)

(52) U.S. Cl.
CPC ............ H01Q 21/22 (2013.01); G01S 7/032 (2013.01); G01S 13/931 (2013.01); H01Q 3/24 (2013.01);
(Continued)

(58) Field of Classification Search
CPC ...... H01Q 21/22; H01Q 21/08; H01Q 1/3233; H01Q 21/005; G01S 13/931; G01S 7/032; G01S 7/036; H04W 16/28
See application file for complete search history.

(56) References Cited

U.S. PATENT DOCUMENTS 8,248,298 B2  8/2012  Lalezari
9,869,762 B1  1/2018  Alland et al.
(Continued)

FOREIGN PATENT DOCUMENTS

WO  2017078184 A1  5/2017
WO  2019005870 A1  1/2019
WO  2019172955 A2  9/2019

OTHER PUBLICATIONS

Fan beam. (1992). Academic Press Dictionary of Science and Technology (4th ed.). Elsevier Science & Technology. Credo Reference: https://search.credoreference.com/content/entry/apdst/fan_beam/0 (Year: 1992).*

(Continued)

Primary Examiner — Bernarr E Gregory
Assistant Examiner — Fred H Mull
(74) Attorney, Agent, or Firm — Fogg & Powers LLC

(57) ABSTRACT

In an embodiment, an antenna includes a one-dimensional array of antenna cells, a signal feed, and signal couplers. The antenna cells are each spaced from an adjacent antenna cell by less than one half a wavelength at which the antenna cells are configured to transmit and to receive, are configured to generate an array beam that is narrower in a dimension than in an orthogonal dimension, and are configured to steer the array beam in the dimension. And the signal couplers are each configured to couple a respective one of the antenna cells to the signal feed in response a respective control signal having an active level. For example, the antenna cells can be (Continued)

arranged such that a straight line intersects their geometric centers.

26 Claims, 12 Drawing Sheets

(51) Int. Cl.
    *G01S 13/931*    (2020.01)
    *G01S 7/03*    (2006.01)
    *H01Q 3/28*    (2006.01)
    *H01Q 3/34*    (2006.01)
    *H01Q 3/24*    (2006.01)
    *H01Q 21/29*    (2006.01)
    *H01Q 21/06*    (2006.01)
    *H01Q 21/08*    (2006.01)
    *H01Q 1/32*    (2006.01)
    *H01Q 1/28*    (2006.01)

(52) U.S. Cl.
    CPC .............. *H01Q 3/28* (2013.01); *H01Q 3/34* (2013.01); *H01Q 21/065* (2013.01); *H01Q 21/293* (2013.01); *H04W 16/28* (2013.01); *G01S 7/036* (2013.01); *H01Q 1/28* (2013.01); *H01Q 1/3233* (2013.01); *H01Q 21/08* (2013.01)

(56) References Cited

U.S. PATENT DOCUMENTS

| | | | |
|---|---|---|---|
| 10,446,920 | B1 | 10/2019 | Meador et al. |
| 2007/0132631 | A1 | 6/2007 | Henson et al. |
| 2007/0279294 | A1 | 12/2007 | York |
| 2010/0141527 | A1 | 6/2010 | Lalezari |
| 2012/0068882 | A1 | 3/2012 | Blachford |
| 2012/0139786 | A1 | 6/2012 | Puzella et al. |
| 2012/0194399 | A1* | 8/2012 | Bily .................. H01Q 15/0006 343/772 |
| 2014/0070994 | A1 | 3/2014 | Schmalenberg et al. |
| 2014/0105054 | A1 | 4/2014 | Saegrov et al. |
| 2014/0266919 | A1* | 9/2014 | Chen .................. H01Q 1/2283 343/700 MS |
| 2015/0229032 | A1 | 8/2015 | Liu et al. |
| 2015/0318618 | A1 | 11/2015 | Chen et al. |
| 2015/0355313 | A1 | 12/2015 | Li et al. |
| 2015/0380828 | A1 | 12/2015 | Black et al. |
| 2016/0011307 | A1 | 1/2016 | Casse et al. |
| 2016/0372834 | A1 | 12/2016 | Bily et al. |
| 2017/0061799 | A1 | 3/2017 | Fujii et al. |
| 2018/0040955 | A1 | 2/2018 | Vouvakis et al. |
| 2018/0372837 | A1 | 12/2018 | Bily et al. |
| 2019/0115651 | A1 | 4/2019 | Driscoll et al. |

OTHER PUBLICATIONS

S. Park et al., A Slotted Post-Wall Waveguide Array With Interdigital Structure for 45° Linear and Dual Polarization, IEEE Transactions on Antennas and Propagation, vol. 53(9), p. 2865-2871, Sep. 2005 (Year: 2005).*

Y. Huang et al., Antennas: From Theory to Practice, Wiley, p. 180-184, 2008 (Year: 2008).*

K. Sakakibara, High-gain Millimeter-wave Planar Array Antennas with Traveling-wave Excitation, in G. Kouemou (ed.), Radar Technology, p. 319-340, 2009 (Year: 2009).*

U.S. Patent and Trademark Office, "Restriction Requirement", U.S. Appl. No. 16/159,567, dated Jun. 11, 2020, p. (s) 1 through 6, Published: US.

International Searching Authority, "International Search Report and Written Opinion from PCT Application No. PCT/US2018/055737 dated Apr. 18, 2019", from Foreign Counterpart to U.S. Appl. No. 16/159,567, pp. 1-25, Published: WO.

International Searching Authority, "Invitation to Pay Additional Fees from PCT Application No. PCT/US2018/055737 dated Jan. 31, 2019", from Foreign Counterpart to U.S. Appl. No. 16/159,567, pp. 1-21, Published: WO.

Martinez et al., "High-Efficiency FET/Microstrip-Patch Oscillators", IEEE Antennas and Propagation Magazine, Feb. 1994, pp. 16-19, vol. 36, No. 1, IEEE.

Park et al., "A Slotted Post-Wall Waveguide Array With Interdigital Structure for 45° Linear and Dual Polarization", IEEE Transaction on Antennas and Propagation, Sep. 2005, pp. 2865-2871, vol. 53, No. 9, IEEE.

International Bureau, "International Preliminary Report on Patentability from PCT Application No. PCT/US2018/039600", from Foreign Counterpart to U.S. Appl. No. 16/019,371, dated Jan. 9, 2020, pp. 1-12, Published: WO.

U.S. Patent and Trademark Office, "Office Action", U.S. Appl. No. 16/159,567, dated Oct. 16, 2020, p. 1 through 47, Published: US.

Harter, Marlene et al. "Realization of an Innovative 3D Imaging Digital Beamforming Radar System"; 2011 IEEE CIE International Conference; Oct. 24, 2011; pp. 186-189.

International Searching Authority; Notification of Transmittal of the International Search Report and the Written Opinion of the International Searching Authority from PCT Application No. PCT/US2018/039600 dated Oct. 9, 2018; from Foreign Counterpart of U.S. Appl. No. 16/019,371; pp. 1-19; Published: EP.

International Bureau, "International Preliminary Report on Patentability from PCT Application No. PCT/US2018/055737", from Foreign Counterpart to U.S. Appl. No. 16/159,567, dated Apr. 23, 2020, p. 1 through 17, Published: WO.

U.S. Patent and Trademark Office, "Office Action", U.S. Appl. No. 16/019,371, dated May 26, 2020, p. 1 through 77, Published: US.

Hassanien et al., "Phased-MIMO Radar: A Tradeoff Between Phased-Array and MIMO Radars", Aug. 15, 2009, pp. 1-34.

International Searching Authority, "International Search Report and Written Opinion from PCT Application No. PCT/US2018/050090 dated Oct. 1, 2019", from Foreign Counterpart to U.S. Appl. No. 16/125,486, pp. 1-19, Published: WO.

U.S. Patent and Trademark Office, "Final Office Action", U.S. Appl. No. 16/019,371, dated Jan. 8, 2021, p. 1 through 58, Published: US.

International Bureau, "International Preliminary Report on Patentability from PCT Application No. PCT/US2018/050090", from Foreign Counterpart to U.S. Appl. No. 16/125,486, dated Mar. 19, 2020, pp. 1-13, Published: WO.

U.S. Patent and Trademark Office, "Advisory Action", U.S. Appl. No. 16/019,371, filed May 19, 2021, pp. 1-7, Published: U.S.

U.S. Patent and Trademark Office, "Notice of Allowance", U.S. Appl. No. 16/019,371, filed Jul. 13, 2021, pp. 1-64, Published: U.S.

* cited by examiner

ANTENNA ARRAY HAVING A DIFFERENT BEAM-STEERING RESOLUTION IN ONE DIMENSION THAN IN ANOTHER DIMENSION

PRIORITY CLAIM(S) AND RELATED PATENT APPLICATION(S)

The present patent application claims priority to U.S. Provisional Patent App. Ser. No. 62/555,571, titled "ANTENNA ARRAY HAVING A DIFFERENT BEAM-STEERING RESOLUTION IN ONE DIMENSION THAN IN ANOTHER DIMENSION, which was filed 7 Sep. 2017, and which is incorporated by reference herein.

The present patent application claims priority to U.S. Provisional Patent App. Ser. No. 62/572,043, titled "BEAM-STEERING ANTENNA, which was filed 13 Oct. 2017, and which is incorporated by reference herein.

The present patent application is related to U.S. patent application Ser. No. 16/019,371, titled "ANALOG ARRAY THAT INCLUDES ANALOG BEAM-STEERING TRANSMIT ANTENNA AND ANALOG BEAM-STEERING RECEIVE ANTENNA ARRANGED ORTHOGONALLY TO THE TRANSMIT ANTENNA, AND RELATED SUBSYSTEM, SYSTEM, AND METHOD," which was filed 26 Jun. 2018, and which is incorporated by reference herein.

SUMMARY

A traditional phased-array radar system is unsuitable for some applications due to, e.g., its cost, size, weight, power requirements (sometimes referred to by the acronym "C-SWAP"), and the number of array elements per unit area (element density). For example, the phased array of a traditional radar system may be too dense, and the radar system may scan a field of view (FOV) too slowly and be too expensive, for use in a self-driving automobile. Similarly, the phased array of a traditional radar system may be too dense, and the radar system may be too expensive, too heavy, and too power hungry, for use in a small drone or other unmanned vehicle.

Therefore, beam-steering radar systems that have been developed for such applications are lighter, less-dense, less-expensive, and less power-hungry than a traditional phased-array radar system, and can scan a FOV more quickly than a traditional phase-array radar system.

A holographic antenna can be suitable for use with, or as part of, such a beam-steering radar system. Such an antenna typically includes a two-dimensional square array of antenna elements arranged in rows and columns. By dynamically controlling the respective level of coupling (e.g., the impedance) between each antenna element and a common transmission medium (e.g., micro-strip waveguide), the beam-steering radar system can form, and electronically steer, a transmit beam or a receive beam in two dimensions with a resolution that depends on the number of antenna elements and the spacing between adjacent antenna elements. For example, such a beam-steering radar system can control the coupling between each antenna element and the transmission medium in a binary fashion such that each antenna element is either "on," i.e., coupled to the transmission medium via a lower impedance, or "off," i.e., coupled to the transmission medium via a higher impedance. Or, the radar system can control the coupling between each antenna element and the transmission medium in a digital fashion such that the coupling impedance between the antenna element and the transmission medium ranges between a lower impedance and a higher impedance in a stepped or quantized manner in which there are more than two available values for the coupling impedance. Alternatively, the radar system can control the coupling between each antenna element and the transmission medium in an analog fashion such that the coupling impedance between the antenna element and the transmission medium ranges between a lower impedance and a higher impedance in a continuous, or near-continuous, manner. And because the square array includes the same number of antenna elements and the same antenna-element spacing in both dimensions, the beam-steering resolution is the same in both dimensions.

Unfortunately, the frequency of a signal that such a beam-steering radar system can be designed to transmit and to receive via the antenna can be limited by the electronic coupling devices of the antenna. Typically, the higher the signal frequency, the smaller the size of each antenna element, and the smaller the spacing between adjacent antenna elements. Furthermore, for each antenna element, the antenna typically includes a respective electronic coupling device (e.g., a diode) for coupling/uncoupling the antenna element to/from the transmission medium. Unfortunately, as the sizes of the antenna elements, and the spaces between adjacent antenna elements, shrink with an increase in signal frequency, the sizes of the coupling devices cannot be made to shrink on the same scale. That is, the density (number per unit area) of the coupling devices typically reaches its upper limit before the density of the antenna elements reaches its upper limit. Therefore, there is a critical antenna-element size, and a critical inter-antenna-element spacing, below which the antenna lacks sufficient space to include one coupling device per antenna element. Consequently, the critical antenna-element size and the critical inter-antenna-element spacing effectively set the maximum frequency for which such a beam-steering radar system can be designed.

One technique for allowing an increase in the maximum frequency of such a beam-steering radar system beyond the limit set by the critical antenna-element size and critical inter-antenna-element spacing is to construct the antenna from multiple conductive layers. For example, the antenna elements can be disposed in a top layer, the electronic coupling devices can be disposed in one or more middle layers, and the transmission medium can be disposed in one or more bottom layers. By disposing the antenna elements and the coupling devices in separate layers, the coupling-device density can be further increased, and, therefore, critical antenna-element size and the critical inter-antenna-element spacing can be further decreased to increase the maximum frequency for which the antenna can be designed.

But unfortunately, constructing the antenna from multiple conductive layers can increase the cost and complexity of the antenna significantly. And even though the critical antenna-element size and the critical inter-antenna-element spacing may be decreased relative to a single-conductive-layer antenna, the critical antenna-element size and the critical inter-antenna-element spacing may still effectively limit the maximum frequency for which such a beam-steering radar system can be designed to a frequency that is below a desired frequency.

In an embodiment, an antenna (or antenna section) that partially or fully solves one or more of the above-described problems includes a greater number of antenna cells in one dimension than it includes in an approximately orthogonal dimension to reduce the number of coupling devices on the antenna, and, therefore, to increase the frequency at which the antenna can operate without significantly increasing the cost or complexity of the antenna. For example, such an antenna can include only a single conductive layer. And although the FOV of such an antenna may be limited, at least in the dimension with fewer antenna cells, the performance of the antenna within this limited FOV can approach, or even equal, the performance of a fully two-dimensional antenna.

In another embodiment, an antenna that partially or fully solves one or more of the above-described problems includes a one-dimensional array of antenna cells, a signal feed, and signal couplers. The antenna cells are each spaced from an adjacent antenna cell by less than one half a wavelength at which the antenna cells are configured to transmit and to receive, are configured to generate an array beam that is narrower in a dimension than in an orthogonal dimension, and are configured to steer the array beam in the dimension. And the signal couplers are each configured to couple a respective one of the antenna cells to the signal feed in response a respective control signal having an active level.

For example, the antenna cells can be arranged such that a straight line intersects their geometric centers.

DETAILED DESCRIPTION

Each value, quantity, or attribute herein preceded by "substantially," "approximately," "about," a form or deriva-tive thereof, or a similar term, encompasses a range that includes the value, quantity, or attribute ±20% of the value, quantity, or attribute, or a range that includes ±20% of a maximum difference from the value, quantity, or attribute. For example, "two antenna arrays are approximately orthogonal to one another" encompasses an angle $72° \leq \alpha \leq 108°$ between the two planes ($|90°|$ is the angular difference between the two planes when they are orthogonal to one another, and ±20% of $|90°|$ is ±18°).

Figure 1:
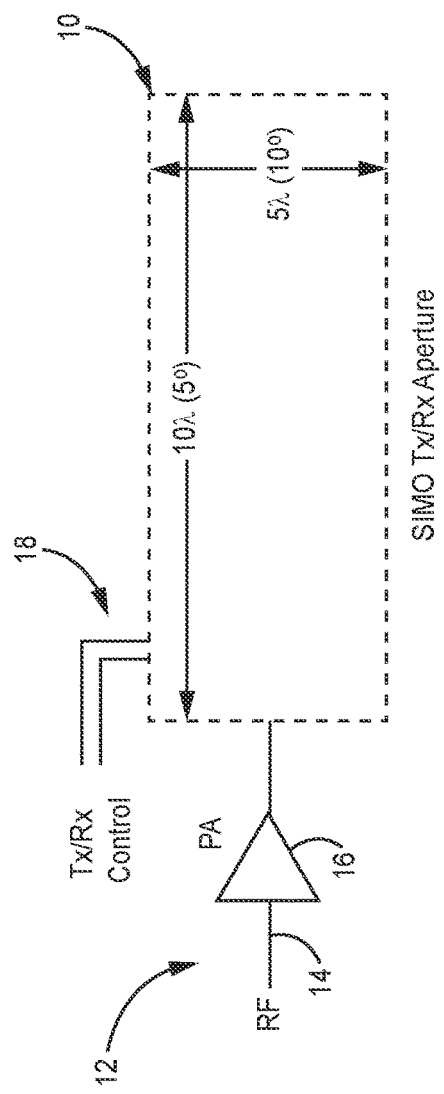
FIG. 1 is a diagram of a Single Input Multiple Output (SIMO) antenna section that can form part of a beam-steering radar system, according to an embodiment.

FIG. 1 is a diagram of a Single Input Multiple Output (SIMO) transmit antenna section 10 of a beam-steering radar system 12, according to an embodiment; the radar system can include other components not shown in FIG. 1, such as amplifiers, phase shifters, and other drive circuitry that are omitted from FIG. 1. Furthermore, the transmit antenna section 10 may form an entire transmit antenna array of the radar system 12, or only a section of the transmit antenna array, which may include one or more other sections similar to the section 10. Moreover, the radar system 12 can be configured to operate in any conventional radar frequency band; for example, the radar system can be configured to operate in the W band, which ranges from 75 GHz-110 GHz, and can be tuned for operation approximately between 76 GHz-81 GHz. In addition, the antenna section 10 can have only a single conductive layer.

The transmit antenna section 10 includes one or more electronically steerable/switchable subarrays (ESA). Furthermore, the transmit antenna section 10 can have any suitable dimensions, such as of approximately W=10λ× H=5λ, where λ is the wavelength for which the transmit antenna section is configured to have a best performance (e.g., the center of the frequency band of interest) in the medium (e.g., air) in which the transmit antenna section is configured to operate.

Each ESA includes one analog RF channel input 14, which is configured to receive an RF signal, i.e., an RF reference wave, which the ESA distributes throughout the ESA area to the antenna elements of the ESA by a conventional method and a conventional structure, e.g., a transmission medium such as a waveguide, transmission line, or microstrip. The radar system 12 can also include a power amplifier 16, which is configured to amplify the RF reference wave before the reference wave is coupled to the ESA. Because all of the one or more ESAs that form the transmit antenna section 10 receive the same RF signal from the same RF channel input 14, the transmit antenna section is described as being a Single Input (SI) antenna section; if all of the one or more transmit antenna sections that form the transmit antenna array of the radar system 12 receive the same RF signal from the same RF channel input, then the entire transmit antenna array is described as being a Single Input (SI) antenna array. And because each ESA includes multiple antenna cells (see FIG. 2 below), the transmit antenna section 10 is described as being a Multiple Output (MO) transmit antenna section.

Each ESA also includes one or more control lines 18, which are configured to receive either a digital or an analog signal, and which provide for the electronic control of the transmit-array beam steering. This control may be implemented as a single digital line, a collection of digital lines (bus), or as a collection of one or more analog lines.

Furthermore, the control lines 18 are configured to carry respective control signals that, depending on the collective state of the control signals over time (e.g., logic high or logic low, or array of analog voltages), electronically activate a particular configuration of the transmit antenna array 10, the particular configuration describing a particular transmit-beam position, transmit-beam side-lobe level, transmit-beam half-power bandwidth (HPBW), etc.

Moreover, multiple ESAs can be configured to work together by coordinating and synchronizing the configurations sent by a control circuit (not shown in FIG. 1) of the radar system 12 via the respective control lines 18.

In addition, although described as a transmission antenna section, the antenna section 10 can be configured to operate as a receive antenna section. During operation as a receive antenna section, the radar system 12 steers a receive beam, and the antenna section 10 provides a receive RF signal to a control circuit (not shown in FIG. 1) of the radar system 12 circuitry via the channel 14 and via an optional amplifier (not shown in FIG. 1) similar to the amplifier 16 but configured to amplify the received RF signal from the antenna section.

Figure 2:
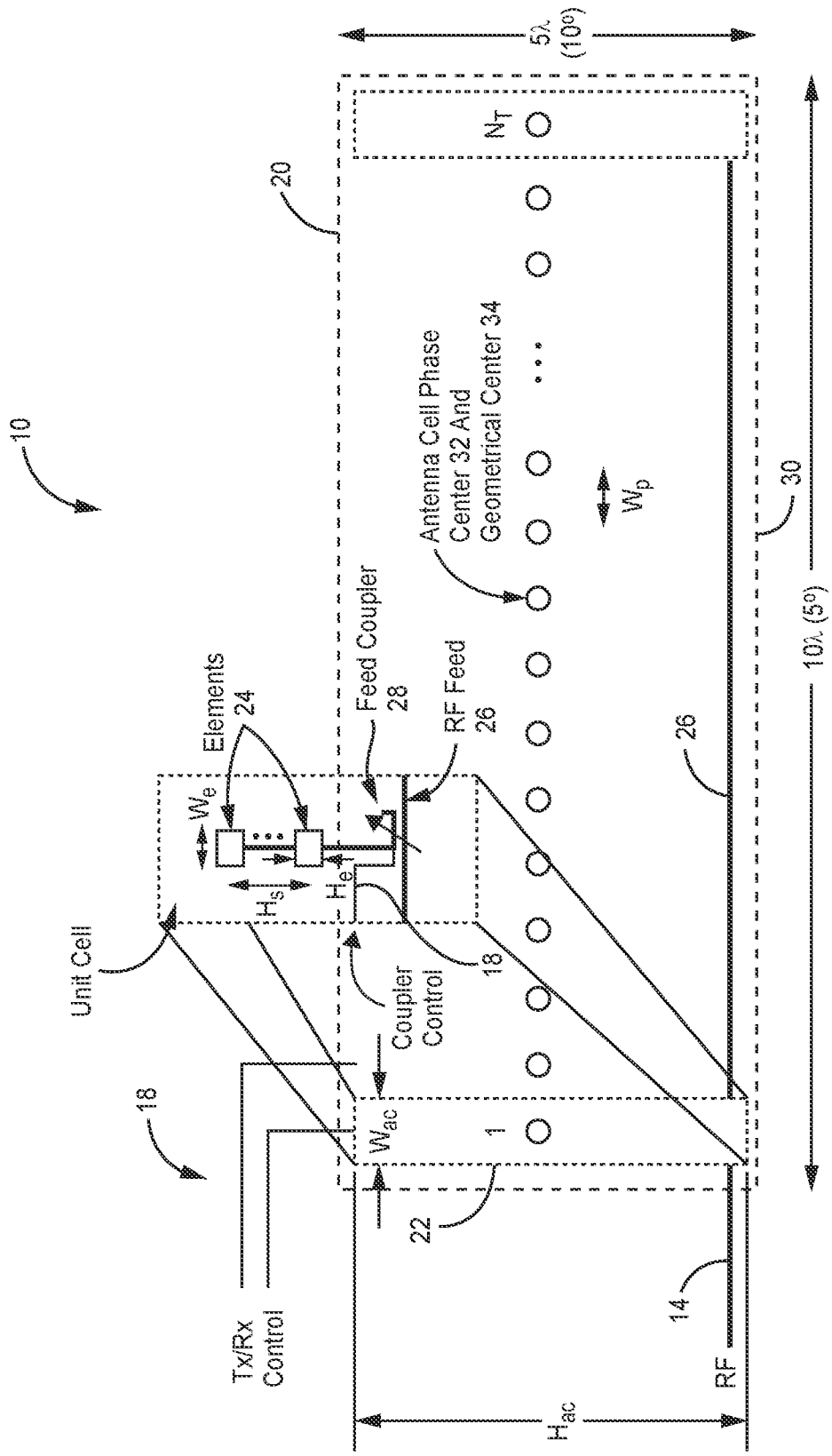
FIG. 2 is a diagram of the SIMO antenna section of FIG. 1, according to an embodiment.

FIG. 2 is a diagram of the SIMO transmit antenna section 10 of FIG. 1, according to an embodiment in which the transmit antenna section includes a single conductive layer. The single conductive layer can be the topmost layer, or other upper layer, of the transmit antenna section 10.

The transmit antenna section 10 further includes, in the single conductive layer, an array 20 of antenna cells 22 (also called unit cells), each of which includes one or more respective antenna elements 24. In an embodiment, the transmit antenna section 10 includes one row, and multiple ($N_T$) columns, of antenna cells 22, although in other embodiments the transmit antenna section can include more than one row of antenna cells (see, e.g., FIG. 6 below) and one, or otherwise fewer than $N_T$, columns. As described below, because the antenna section 10 includes more columns than rows of controllable antenna cells 22, the resolution at which the radar system 12 can steer a beam in the azimuth (AZ) dimension (typically the horizontal dimension) is significantly higher than the resolution at which the radar system can steer the beam in the elevation (EL) dimension (typically the vertical dimension). Therefore, although the beam-steering resolution and FOV in the AZ dimension of the antenna section 10 approaches or equals the beam-steering resolution and FOV in the AZ dimension of a fully 2D array of antenna elements, the beam-steering resolution and FOV in the EL dimension of the antenna section 10 are significantly smaller/lower than the beam-steering resolution and FOV in the EL dimension of a fully 2D antenna array. But within this smaller FOV, the performance of the antenna section 10 can approach, and even equal, the performance of a fully 2D antenna array having antenna cells of the same size and AZ-dimension spacing as the antenna cells 22 of the antenna section 10.

The antenna section 10 also includes, in the single conductive layer, a transmission medium, here an RF feed 26, which is coupled to the channel input 14 (via the output of the amplifier 16 of FIG. 1 if the amplifier is included), which is disposed along an edge 30 of the antenna section, which is configured to distribute an RF reference wave across the antenna section, and which is, therefore, common to all of the antenna cells 22. That is, the RF feed 26 distributes the RF reference wave from the channel input 14 to all of the antenna cells 22. Examples of the RF feed 26 include the following transmission-line structures, with or without a dielectric superstrate: a transmission line, a co-planar waveguide (CPW), a co-planar grounded waveguide (CPGW), a microstrip, and a slotline. Furthermore, a connecting structure (e.g., a coaxial cable and a coaxial-cable connector) couples the RF reference wave from the radar-system reference-wave-generator circuit (not shown in FIG. 2) to the RF feed 26 at a feed edge (the leftmost edge in FIG. 2) of the antenna section 10 such that the RF reference wave propagates along the RF feed from the feed edge to an opposite, i.e., signal-termination, edge (the right most edge in FIG. 2) of the antenna section. Alternatively, the RF reference wave can be fed to the RF feed 26 at any point (i.e., center fed) of the RF feed, such that the RF reference wave propagates along the RF feed from the feed point in both directions (leftward and rightward in FIG. 2) to the signal-termination edges (left and right edges in FIG. 2) of the antenna section 10. Or, the RF feed 26, or other transmission medium, can be located in any suitable location within the antenna array 10, and can include one or more feed points at any suitable one or more locations such that the RF reference wave propagates along the transmission medium outward from the one or more feed points to one or more of the edges of the antenna array.

Furthermore, each antenna cell 22 includes a respective coupling device, here a feed coupler 28, having all of its conductive components in the single conductive layer, and includes one or more antenna elements 24 serially coupled to one or both sides of the feed coupler. For example, as shown in FIG. 2, a group of serially coupled antenna elements 24 is serially coupled to only one side of the feed coupler 28 because the RF feed 26 is disposed along an edge of the antenna section 10. Because the antenna section 10 includes only one respective feed coupler 28 for each antenna cell 22 regardless of how many antenna elements 24 are in each antenna cell, the sizes of the antenna cells can be shrunk as needed to accommodate an increased operational frequency without exceeding the maximum feed-coupler density of the antenna section. That is, including fewer than one feed coupler 28 per antenna element 24 can allow an increase in the operating frequency of the antenna section 10 as compared to a fully 2D antenna section.

The feed coupler 28 of each antenna cell 22 is coupled to a respective one of the control lines 18, and is configured to couple, or is configured to cause the coupling of, the RF reference wave propagating along the RF feed 26 to the antenna elements 24 according to any conventional coupling methodology that may imply native polarization of each antenna cell, and therefore, that may imply native polarization of the entire antenna section 10. Examples of suitable coupling methodologies include magnetic-coupled edge feed, electric-coupled edge feed, series feed, and corporate feed. For example, in the described embodiment, the feed coupler 28 is located along the edge 30 of the antenna section 10 adjacent to the RF feed 26, and can be configured according to any of the above-described coupling methodologies. Alternatively, the feed coupler 28 can be located at the phase center 32 of the respective antenna cell 22 and can be configured according to any of the above-described coupling methodologies, and the RF feed 26 can extend adjacent to the phase centers of the antenna cells. The phase center 32 is the electrical center of the antenna cell 22, and the electrical center is the point at the center of a hypothetical sphere having a surface where the far-field radiation pattern of the antenna cell has the same signal phase at all points on the surface. Although the phase centers 32 are shown as being located at the geometrical centers 34 of the respective antenna cells 22, one or more of the phase centers can be located off geometrical center of the respective one or more antenna cells.

Furthermore, the feed coupler 28 can be any conventional device or structure (e.g., a diode) that is configured to couple, or that is configured to cause the coupling of, the RF reference wave propagating along the RF feed 26 to the antenna elements 24 of the antenna cell 22. For example, the feed coupler 28 can include a transmissive-type switch that is in-line (i.e., in electrical series) between the RF feed 26 and the antenna elements 24 and that has an impedance (i.e., signal-coupling level) that the control signal on the control line 18 can select (e.g., the first state of binary control signal can cause the feed coupler to have a low-impedance or "on" state, and the second state of the binary control signal can cause the feed coupler to have a high-impedance or "off" state). Furthermore, the feed coupler 28 can include a shunt (reflective)-type switch that is tangent to, in shunt with, or is otherwise adjacent to, a signal path between the RF feed 26 and the antenna elements 24 and that is configured to vary the impedance level, and, therefore, the signal-reflection/signal-coupling level, of the signal path in response to the level of the control signal on the control line 18. Moreover, the feed coupler 28 can include a resonant-type switch that is configured to control, in response to the control signal on the control line 18, a frequency at which the antenna cell 22 resonates (e.g., a frequency at which a series or parallel combination of one or more of the RF feed 26, feed coupler 28, and antenna elements 24 resonate). The closer the resonant frequency to the frequency of the RF reference wave propagating along the RF feed 26, the greater the coupling between the antenna cell 22 and the RF feed; conversely, the farther the resonant frequency from the frequency of the RF reference wave, the lesser the coupling between the antenna cell and the RF feed. In addition, the feed coupler 28 can be configured to control, in response to the control signal on the control line 18, the dielectric properties of the antenna cell 22, or the dielectric properties of the coupling region between the RF feed 26 and the antenna elements 24, to adjust the coupling level between the antenna elements and the RF feed.

Still referring to FIG. 2, each antenna element 24 has a width approximately equal to $W_e$, a height approximately equal to $H_e$, and is spaced approximately $H_s$ from adjacent antenna elements (or from the feed coupler 28), where $W_e$, $H_e$, and $H_s$ are all typically <λ. Although $W_e$, $H_e$, and $H_s$ are described as being approximately uniform within each antenna cell 22 and from antenna cell to antenna cell, one or more of these dimensions can be non-uniform within an antenna cell or from antenna cell to antenna cell. For example, $W_e$, $H_e$, and $H_s$ can be approximately in the range $\lambda/10 < W_e$, $H_e$, $H_s < \lambda$. Furthermore, although the antenna elements 24 are described as being rectangular, the antenna elements can have any shape, and can be formed from any material, that give advantageous element characteristics, for instance efficiency, gain, bandwidth, HPBW in AZ and EL, etc. Moreover, the antenna elements 24 can include sub-elements, for example, in configurations such as a microstrip-fed patch array, coplanar waveguide (CPW) patch array, etc.

Furthermore, the geometric centers 34 (the same points as the phase centers 32 in an embodiment) of the antenna cells 22 are spaced apart, in the horizontal (e.g., AZ) dimension, by approximately $0.01\lambda \le W_p \le 0.25\lambda$. And although $W_p$ is described as being uniform from antenna cell 22 to antenna cell, $W_p$ can be non-uniform.

Moreover, each antenna cell 22 can be described as having a width $W_{ac} \sim W_p$, and having a height of approximately $H_{ac}$, which is approximately the same as the height (5λ in an embodiment) of the antenna section 10.

Still referring to FIG. 2, alternate embodiments of the antenna section 10 are contemplated. For example, although described as being a transmit antenna section, the antenna section 10 can also be configured, and can be operated, as a receive antenna section. During a receive operation, the radar system 12 controls the antenna section 10 to form and steer a receive beam, and the active antenna units 22 each couple a respective received signal to the RF feed 26, which effectively adds together the received signals from the active antenna units to form a combined received signal, and which provides the combined received signal to the radar-system circuitry for processing. The radar system 12 can also include an amplifier (not shown in FIG. 2) that is configured to amplify the combined received signal from the RF feed 26 and to provide the amplified signal to the radar-system circuitry. Furthermore, although described as including a single conductive layer, the antenna section 10 can include multiple conductive layers. For example, the RF feed 26 can be located in one or more layers that are below the layer(s) in which the feed coupler 28 is located, and the feed coupler can be located below the one or more layers in which the antenna elements 24 are located. Moreover, although shown as being part of each antenna cell 22, one or both of the coupler control node 18, RF feed 26, and feed coupler 28 can be considered to be separate from the antenna cell.

Figure 3:
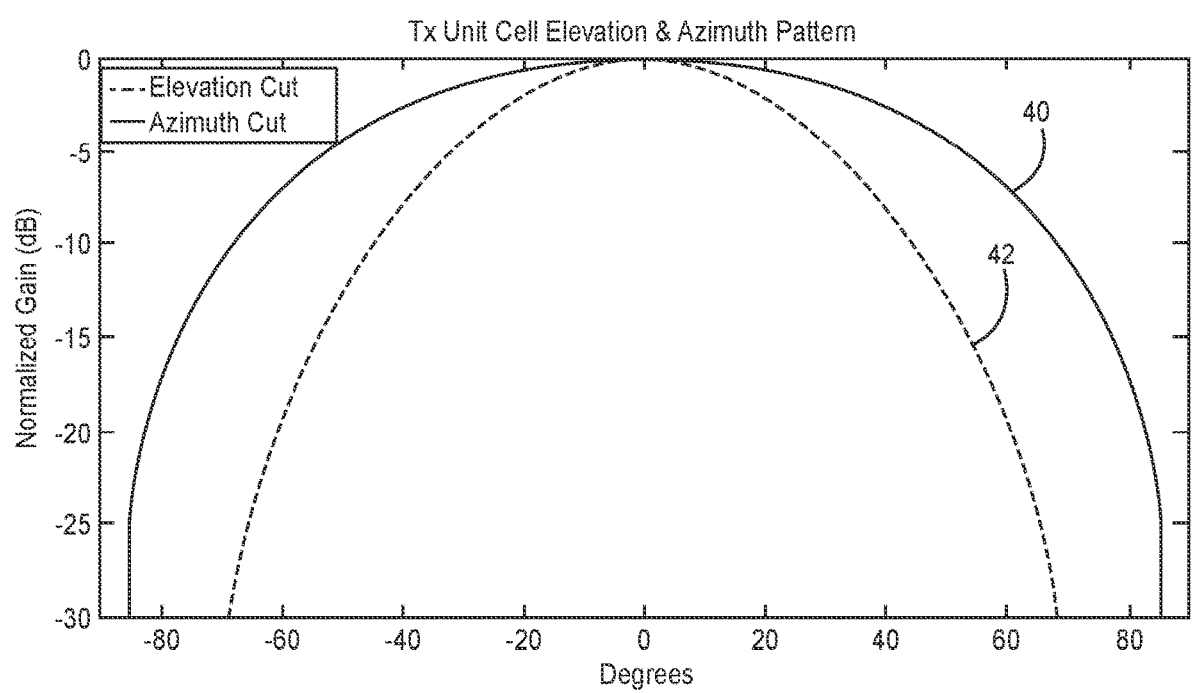
FIG. 3 is a plot of the approximate transmit beam patterns (i.e., gain roll offs) in azimuth (AZ—solid line) and elevation (EL—dashed line) for each antenna cell of FIG. 2 while "on," according to an embodiment.

FIG. 3 is a plot of the approximate beam patterns (i.e., gain roll offs) 40 and 42 in AZ (solid line) and EL (dashed line) for each antenna cell 22 of FIG. 2 while activated, energized, or "on," according to an embodiment. Referring to FIGS. 2-3, an antenna cell 22 is activated, energized, or "on" while the feed coupler 28 is coupling the RF reference wave from the RF feed 26 to the antenna elements 24. Furthermore, the AZ beam pattern 40 is wider than the EL beam pattern 42 because each antenna cell 22 is shorter in the AZ dimension than it is in the EL dimension, i.e., because $W_{ac} < H_{ac}$. As described below, the dimensions and pattern of the antenna elements 24 of an antenna cell 22 not only define the AZ and EL beam patterns for the antenna cell 22, but also define the AZ and EL beam envelopes for the entire antenna section 10. For example, if the antenna cells 22 each have the same AZ beam pattern 40, then the antenna section 10 has an AZ beam envelope that is the same as the antenna-cell AZ beam pattern 40. Similarly, if the antenna cells 22 each have the same EL beam pattern 42, then the antenna section 10 has an EL beam envelope that is the same as the antenna-cell EL beam pattern 42. Consequently, one can configure the antenna cells 22 so as to limit transmitted/received energy outside of a desired FOV in both the AZ and EL dimensions. For example, if the antenna section 10 includes antenna cells 22 configured to give the AZ and EL beam patterns 40 and 42 of FIG. 3, then the antenna section has a half-power (i.e., −3 dB gain) FOV in the AZ dimension of approximately ±40°, and has a half-power FOV in the EL dimension of approximately ±20°. Although half-power FOVs are described, one may define a FOV as being other than a half-power FOV. For example, if the antenna section 10 includes antenna cells 22 configured to give the AZ and EL beam patterns 40 and 42 of FIG. 3, then the antenna section has a quarter-power (−6 dB) FOV in the AZ dimension of approximately ±60° and has a quarter-power FOV in the EL dimension of approximately ±32°. Furthermore, the FOV defined in AZ need not be the same power as the FOV defined in EL. For example, one can describe the antenna section 10 as having an FOV of ±40° in AZ (half-power FOV) and having an FOV of ±32° in EL (quarter-power FOV). And, as further described below, the AZ and EL beam patterns 40 and 42 can reduce the levels side lobes, i.e., can reduce off-axis energy, which is energy transmitted/received outside of a main transmit/receive beam.

Figure 4:
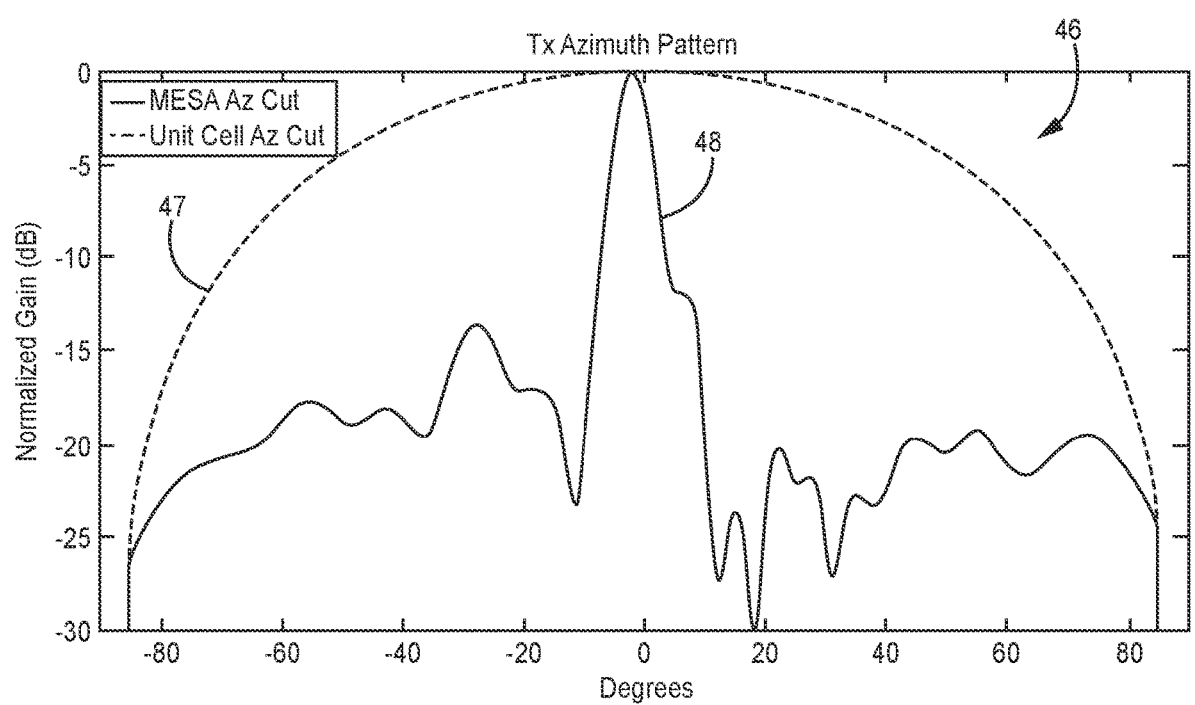
FIG. 4 is a plot of an AZ transmit beam pattern generated by the antenna section of FIGS. 1-2, according to an embodiment.

FIG. 4 is a plot of an AZ beam pattern 46 generated by the transmit antenna section 10 of FIGS. 1-2, according to an embodiment in which the beam pattern 46 includes a main transmit beam 48 at a direction of −2.5° in the AZ dimension, and where each antenna cell 22 of the antenna section has the AZ beam pattern 40 of FIG. 3. As described above in conjunction with FIG. 3, the AZ beam pattern 46 has a beam envelope 47, which is the same as the antenna-cell beam pattern 40.

Figure 5:
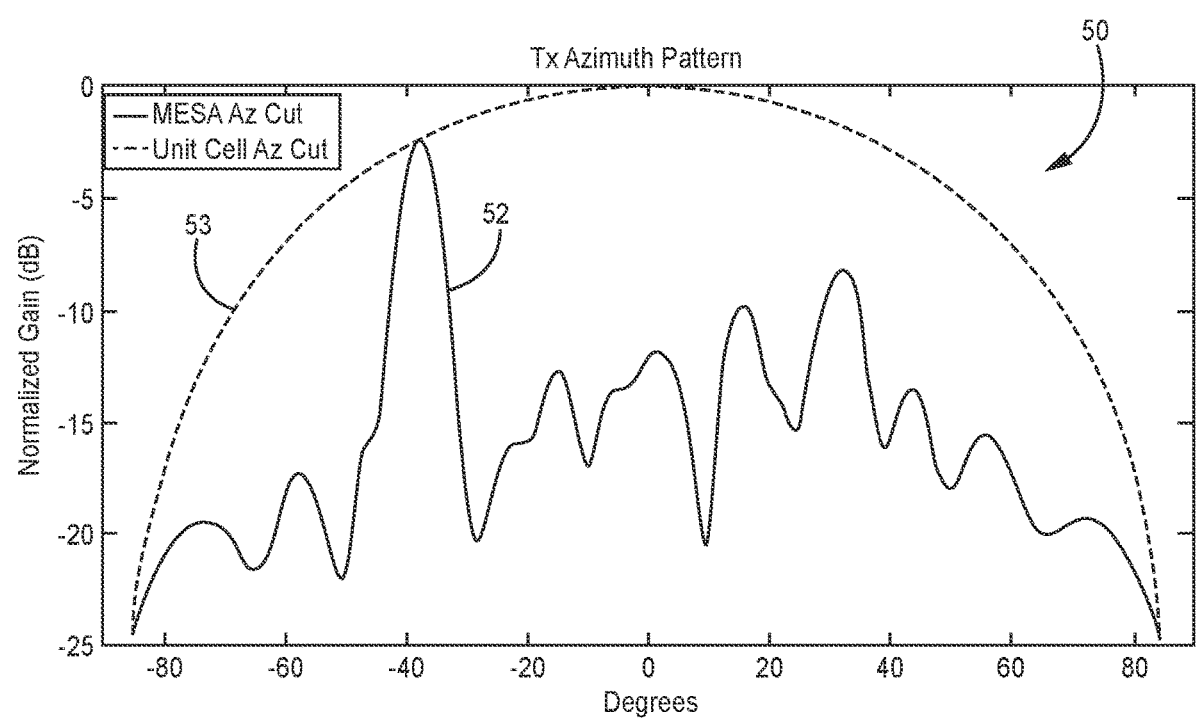
FIG. 5 is a diagram of an AZ transmit beam pattern generated by the antenna section of FIGS. 1-2, according to another embodiment.

FIG. 5 is a plot of an AZ beam pattern 50 generated by the transmit antenna section 10 of FIGS. 1-2, according to an embodiment in which the beam pattern includes a main transmit beam 52 at a direction of −37.5° in the AZ dimension, and where each antenna cell 22 of the antenna section has the AZ beam pattern 40 of FIG. 3, according to an embodiment. As described above in conjunction with FIG. 3, the AZ beam pattern 50 has a beam envelope 53, which is the same as the antenna-cell beam pattern 40.

Referring to FIGS. 1-5, operation of the antenna section 10 of the radar system 12 is described in transmit mode (i.e., while the antenna section is operating as a transmit antenna section), according to an embodiment.

Circuitry (not shown in FIGS. 1-5) of the radar system 12 generates, and an amplifier 16 amplifies, an RF reference wave.

The circuitry (not shown in FIGS. 1-5) also selectively activates one or more of the antenna cells 22, and deactivates the other antenna cells, by driving appropriate signals onto the control lines 18. For example, to activate an antenna cell 22, the circuitry drives a positive voltage (e.g., 12 volts (V)) onto the respective control line 18 coupled to the antenna cell, and to deactivate the antenna cell, the circuitry drives a zero or negative voltage (e.g., −12 V) onto the respective control line. As described above, a control signal activates an antenna cell 22 to one of a various number of levels depending on the impedance that the control signal causes the feed coupler 28 to generate between the RF feed 26 and the antenna elements 24. At each of these active levels, the portion of the RF reference wave coupled to the antenna elements has a respective power level. Said another way, the control signal controls the amount of power of the RF reference wave that the feed coupler 28 causes to be coupled to the antenna elements 24.

The circuitry (not shown in FIGS. 1-5) of the radar system 12 activates and deactivates the antenna cells 22 according to a pattern that has been previously determined to generate a transmit beam pattern having a main beam with corresponding characteristics. For example, referring to FIG. 4, one such pattern of activated and deactivated antenna cells 22 results in the transmit beam pattern 46 having the main beam 48 at a direction of approximately 0° with a HPBW of approximately 5° in AZ and a HPBW of approximate 10° in EL (the EL dimension is not shown in FIG. 4), and with no side lobe in a plane corresponding to the plot of FIG. 4 having a power that is higher than approximately −14 dB relative to the power of the main beam 48. And referring to FIG. 5, another such pattern of activated and deactivated antenna cells 22 results in the transmit beam pattern 50 having the main beam 52 at a direction of approximately −40° with a HPBW of approximately 5° in AZ and a HPBW of approximate 10° in EL (the EL dimension is not shown in FIG. 5), and with no side lobe in a plane corresponding to the plot of FIG. 5 having a power that is higher than approximately −9 dB relative to the power of the main beam 52. Furthermore, referring to FIGS. 4-5, the beam AZ patterns 46 and 50 have respective AZ envelopes 47 and 53 that are the same as the AZ beam pattern 40 (FIG. 3) of a single antenna cell 22.

By changing the pattern of activated and deactivated antenna cells 22, the circuitry can change the direction of the main transmit beam, and, therefore, can steer the main transmit beam back and forth across a FOV in the AZ dimension in any suitable steering or scan pattern (e.g., in an ordered pattern such as raster scan or conical scan, in a disordered pattern such as a Hadamard scan or random scan, or in a dynamically or intelligently sequenced pattern such as a task-able illumination scan or prioritized FOV time-weighting scan).

Because the antenna section 10 includes only a single row of antenna cells 22, the radar system 12 cannot steer the beam in the EL dimension.

But within the limited FOV (e.g., ±60° in AZ, ±10° in EL) of the antenna section 10, the radar system is configured to deliver performance (e.g., main-beam width, steering resolution) that approximates the performance of a fully 2D holographic ESA radar system.

Still referring to FIGS. 1-5, although operation of the antenna section 10 is described for a transmit mode while the antenna section is operating as a transmit antenna section, i.e., is generating and steering a main transmit beam, the antenna section can also be used, i.e., can be configured and operated as, as a receive antenna section in the radar system 12 or in another system. Operation in a receive mode can be the same as described above for the transmit mode except that the antenna section 10 receives a signal, and provides the received signal to the radar-system circuitry via the RF channel 14 (and via an amplifier if included). In more detail, in operation during a receive mode, the respective feed coupler 28 of each active antenna cell 22 couples, to the RF feed 26, a signal that the antenna elements 24 of the cell receive. Therefore, a sum of the signals received by all of the active antenna cells 22 propagates along the RF feed 26 to the circuitry (not shown in FIGS. 1-5) of the radar subsystem 12 via the RF channel 14. By selectively activating the antenna cells 22, the circuitry can generate and can steer a main receive beam along which the antenna section 12 receives signals. For example, the main receive beam can have characteristics (e.g., width, direction) similar to the characteristics of the main transmit beam 48 or the main transmit beam 52 of FIGS. 4 and 5. And the circuitry can process the summed signal received from the RF channel 14 to detect an object (not shown in FIGS. 1-5) in the path of the main receive beam, e.g., an object that redirects a portion of the signal that the antenna section 10 previously transmitted along a main transmit beam that intersected the object.

Furthermore, although described as being oriented such that the row of antenna cells 22 lie approximately in the AZ dimension, one can rotate the antenna section 10 approximately 90° such that the antenna cells lie in approximately in the EL dimension, and such that the antenna section is configured to steer a beam in the EL dimension.

Figure 6:
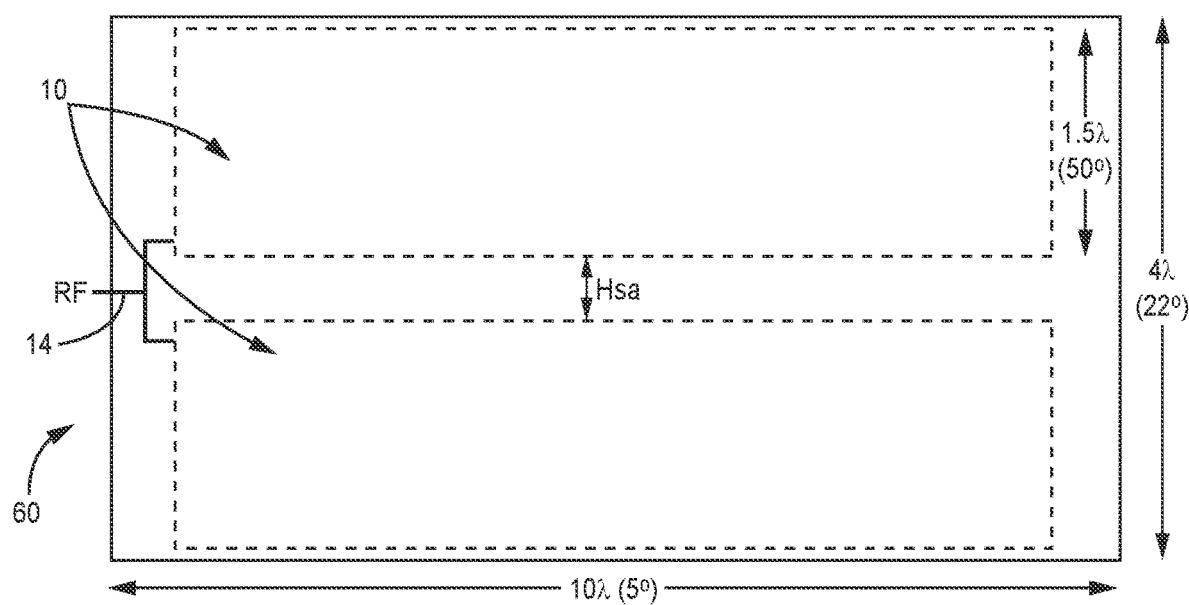
FIG. 6 is a diagram of an antenna formed from two "stacked" antenna sections of FIGS. 1-2, according to an embodiment.

FIG. 6 is a diagram of an antenna 60 formed from two "stacked" antenna sections 10 of FIGS. 1-2, according to an embodiment in which the antenna 60 replaces the single antenna section 10 of the radar system 12. The antenna sections 10 can also be referred to as subarrays 10 of the antenna 60.

During a transmit mode of operation, the antenna 60 and subarrays 10 are configured to operate as a transmit antenna and transmit subarrays, respectively.

Both transmit subarrays 10 are configured to be driven with the same RF signal via a common RF feed 14 and amplifier 16 (amplifier optional and not shown in FIG. 6), and each subarray can have the same structure as described above in conjunction with FIGS. 1-2.

Stacking the subarrays 10 in the EL dimension increases the effective aperture of the transmit antenna 60 in the EL dimension, and thus reduces the HPBW of the main transmit beam in the EL dimension. Where the subarrays 10 have the same dimensions, stacking two subarrays reduces the HPBW of the main beam in the EL dimension by approximately half as compared to the main beam generated by a single subarray. For example, for the following dimensions described in conjunction with FIG. 6, the transmit antenna 60 generates a main transmit beam in the EL dimension having a HPBW of approximately 22°, which is approximately half of the approximately 50° (i.e., ±25°) EL HPBW of the main transmit beam generated by a single subarray 10: stack height=~4λ, stack width=~19λ, subarray height=~1.5λ.

Stacking the subarrays 10 in the EL dimension also effectively adds another row of antenna cells 22 to the antenna 60, and thus allows the radar system 12 to steer a beam in the EL dimension as well as in the AZ dimension. Spacing the subarrays 10 apart by a distance $H_{sa}$ that is at least λ/2 (where λ is the center frequency of the frequency range for which each subarray is designed) allows such steering in the EL dimension. As described above, increasing the spacing $H_{sa}$ to be greater than λ/2 allows a designer to tailor the width of a beam in the EL dimension (generally the greater $H_{sa}$ the greater the effective aperture of the antenna 60, and, therefore, the narrower the width of the beam in the EL dimension). And although increasing the spacing $H_{sa}$ to be greater than λ/2 can cause the antenna 60 to generate relatively large side (grating) lobes in the EL dimension, as described below, a designer can tailor the beam envelope of the antenna 60 in the EL dimension to limit the sizes of the side lobes in the EL dimension.

Still referring to FIG. 6, during a receive mode of operation, the antenna 60 and subarrays 10 are configured to operate as a receive antenna and receive subarrays, respectively. Further during a receive operation, the receive beam patterns generated by the antenna 60 can have characteristics (e.g., HPBW, steerability) similar to the transmit beam patterns generated by the antenna 60 as described above.

Figure 7:
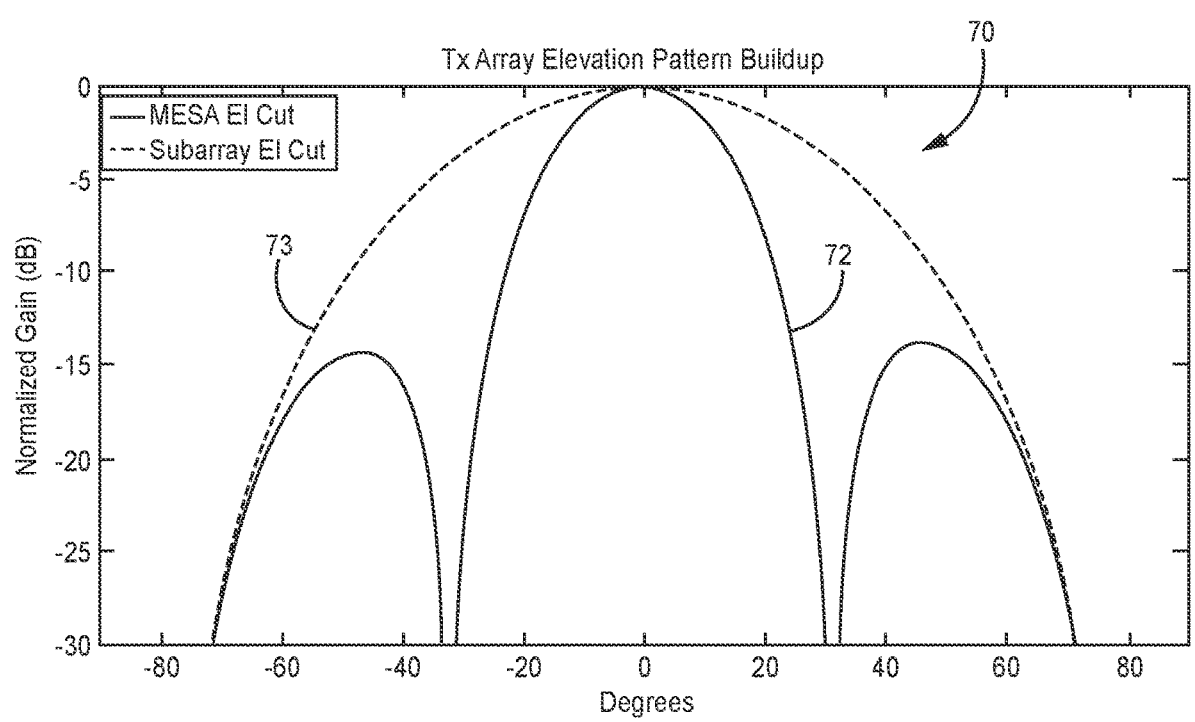
FIG. 7 is a plot of an EL beam pattern generated by the antenna of FIG. 6, according to an embodiment.

FIG. 7 is a plot of an EL beam pattern 70 generated by the antenna 60 of FIG. 6, where the beam pattern includes a main beam 72 at a direction of 0° in the EL dimension, and includes a beam envelope 73 in the EL dimension, according to an embodiment. Where the antenna units 22 of each subarray 10 have the same beam pattern in the EL dimension, the beam envelope 73 is the same as EL-dimension beam pattern of each antenna unit. Consequently, a designer can configure the antenna units 22 to have an EL-dimension beam pattern that imparts to the antenna 60 an EL-dimension beam envelope 73 having a desired roll off to limit the gains of side lobes in the EL dimension. Furthermore, the beam pattern 70 can be a transmit beam pattern while the antenna 60 of FIG. 6 is operating in a transmit mode, and can be a receive beam pattern while the antenna is operating in a receive mode.

Figure 8:
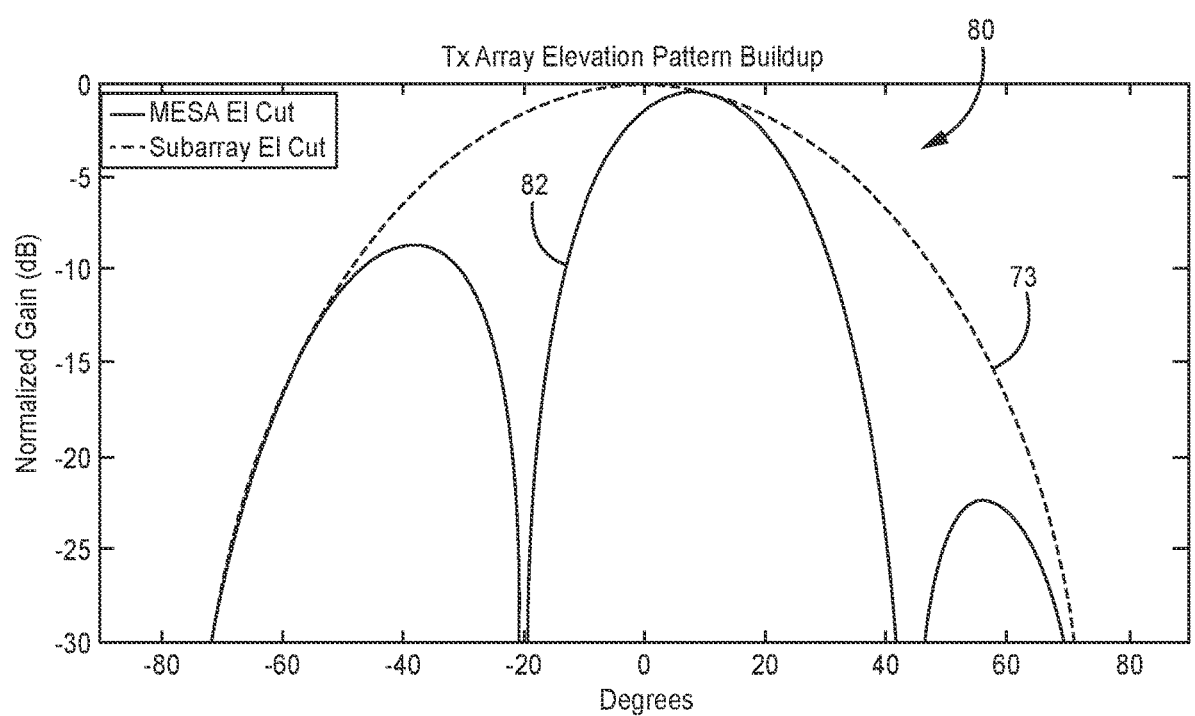
FIG. 8 is a plot of an EL beam pattern generated by the antenna of FIG. 6, according to an embodiment.

FIG. 8 is a plot of an EL beam pattern 80 generated by the antenna 60 of FIG. 6, where the beam pattern includes a main beam 82 at a direction of approximately 7° in the EL dimension, and includes the beam envelope 73, according to an embodiment. The beam pattern 80 can be a transmit beam pattern while the antenna 60 of FIG. 6 is operating in a transmit mode, and can be a receive beam pattern while the antenna is operating in a receive mode.

Referring to FIGS. 6-8, operation of the antenna 60 of the radar system 12 is described during a transmit mode, according to an embodiment.

Circuitry (not shown in FIGS. 6-8) of the radar system 12 generates, and drives the amplifier 16 (FIG. 1, if present), with a RF reference wave.

The circuitry (not shown in FIGS. 6-8) also selectively activates one or more of the antenna cells 22 (FIG. 2) of the antenna 60, and deactivates the other one or more antenna cells, by driving appropriate signals onto the control lines 18 (FIG. 2). For example, to activate an antenna cell 22, the circuitry drives a positive voltage (e.g., 12 V) onto the respective control line 18 coupled to the antenna cell, and to deactivate the antenna cell, the circuitry drives a zero or negative voltage (e.g., −12 V) onto the respective control line. As described above, a control signal can activate an antenna cell 22 to one of a various number of levels depending on the impedance that the control signal causes the feed coupler 28 to generate between the RF feed 26 and the antenna elements 24. At each of these active levels, the portion of the RF reference wave coupled to the antenna elements has a respective power level. Said another way, the control signal controls the amount of power of the RF reference wave that the feed coupler 28 causes to be coupled to the antenna elements 24.

The circuitry (not shown in FIGS. 6-8) activates and deactivates the antenna cells 22 (FIG. 2) according to a pattern that has been previously determined to generate a transmit beam pattern having a main transmit beam with corresponding characteristics. For example, referring to FIG. 7, one such pattern of activated and deactivated antenna cells 22 results in the transmit beam pattern 70 having the main beam 72 at a direction of approximately 0° with a HPBW of approximately 22° in EL and a HPBW of approximate 5° in AZ (the AZ dimension is not shown in FIG. 7), and with no side lobe having a power that is higher than approximately −14 dB relative to the power of the main beam 72 in the plane of the plot of FIG. 7. And referring to FIG. 8, another such pattern of activated and deactivated antenna cells 22 results in the transmit beam pattern 80 having the main beam 82 at a direction of approximately 7° with a HPBW of approximately 22° in EL and a HPBW of approximate 5° in AZ (the AZ dimension is not shown in FIG. 8), and with no side lobe having a power that is higher than approximately −9 dB relative to the power of the main beam 82 in the plane of the plot of FIG. 8. Furthermore, referring to FIGS. 7-8, the beam EL patterns 70 and 80 each have an EL envelope 73, which is the same as the EL beam pattern 42 (FIG. 3) of a single antenna cell 22.

By changing the pattern of activated and deactivated antenna cells 22 (FIG. 2), the circuitry (not shown in FIGS. 6-8) of the radar system 12 can change the direction of the main transmit beam, and, therefore, can steer the main transmit beam back and forth across a FOV in both the AZ and EL dimensions and in any suitable steer or scan pattern (e.g., in an ordered pattern such as raster scan or conical scan, in a disordered pattern such as a Hadamard scan or random scan, or in a dynamically or intelligently sequenced pattern such as a task-able illumination scan or prioritized FOV time-weighting scan). Because the number of antenna cells 22 in each subarray 10 (i.e., in each row) is significantly greater than the number of subarrays, the resolution with which the radar system 12 can steer the main transmit beam in the AZ dimension (e.g., in steps of approximately between 1° and 5°) is significantly greater than the resolution with which the radar system can steer the main transmit beam in the EL dimension (e.g., in steps of approximately between 7° and 12°).

Still referring to FIGS. 6-8, although the antenna 60 is described as being a transmit antenna, the antenna 60 can also be used as a receive antenna in the radar system 12 or in another system. Operation in a receive mode can be the same as described above for the transmit mode except that the antenna 60 receives one or more signal, generates a receive wave along the RF feed 26, and provides the received signal to the radar-system circuitry (not shown in FIGS. 6-8) via the RF feed and the RF channel 14 (and via an RF amplifier 16 if included).

Figure 9:
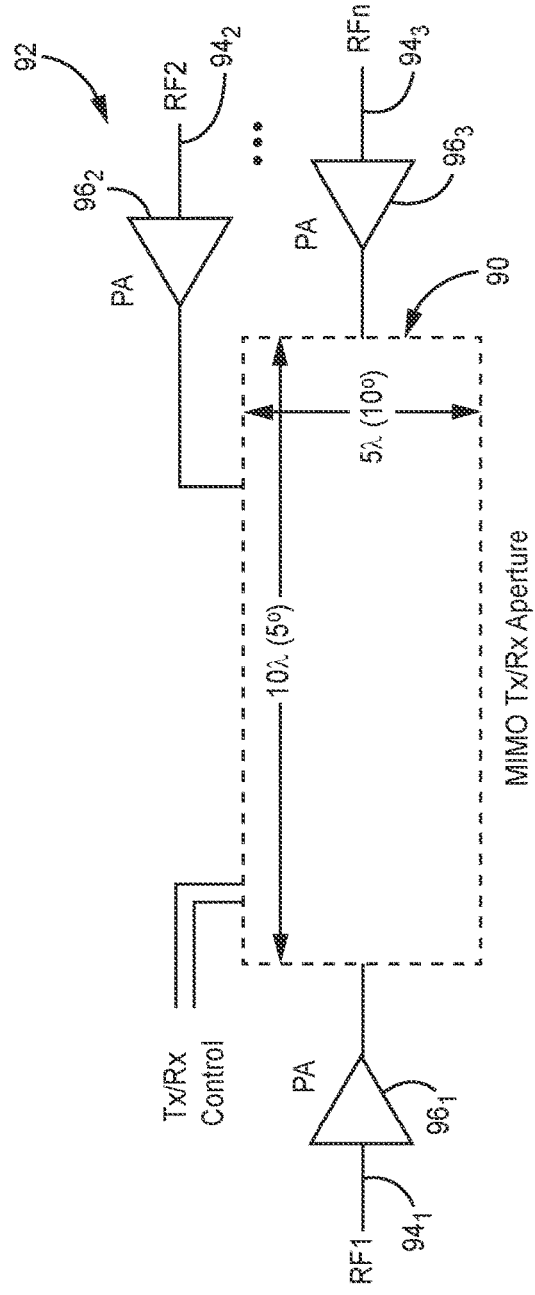
FIG. 9 is a diagram of a Multiple Input Multiple Output (MIMO) ESA antenna section, according to an embodiment.

FIG. 9 is a diagram of a Multiple Input Multiple Output (MIMO) ESA transmit antenna section 90 (such as a holographic antenna section) of a radar system 92, according to an embodiment; the radar system can include other components not shown in FIG. 9, such as amplifiers, phase shifters, and other drive circuitry that are omitted from FIG. 9. Furthermore, the transmit antenna section 90 may form an entire transmit antenna of the radar system 92, or only a section of the transmit antenna, which may include one or more other sections similar to the section 90.

The transmit antenna section 90 is similar to the transmit antenna section 10 of FIGS. 1-2, except that the antenna section 90 includes multiple RF feeds $94_1$-$94_3$ each coupled to a respective group of the antenna cells 22 (FIG. 2) via a respective RF amplifier $96_1$-$96_3$. That is, unlike the antenna cells 22 of the transmit antenna section 10, which antenna cells all receive the same RF signal from the RF feed 26 (FIG. 2), the antenna cells (not shown in FIG. 9) of the transmit antenna 90 are divided into groups, and each group is configured to receive a different RF signal from the circuitry (not shown in FIG. 9) of the radar system 92. In more detail, each of the RF feeds 94 is coupled (via a respective amplifier 96 if present) to a respective RF feed 26 (FIG. 2) corresponding to a respective group of the antenna cells 22. Alternately, the RF feeds 94 can be called RF channels, each similar to the RF channel 14 of FIG. 1.

Including multiple RF feeds 94 so that different groups of the antenna cells 22 (FIG. 2) are configured to receive different RF signals from the circuitry (not shown in FIG. 9) of the radar system 92 adds another degree of freedom to the beam-forming algorithms. That is, by altering the phases, frequencies, or powers of the different RF signals to generate a particular transmit beam pattern, or series of transmit beam patterns, a designer may be able to improve one or more characteristics of the transmit beam pattern or series of transmit beam patterns as compared to the transmit beam pattern and series of transmit beam patterns generated by the SIMO transmit antenna section 10 of FIGS. 1-2. For example, a designer may be able to reduce the total side-lobe energy, or the power of the largest side lobe, generated by the antenna section 90 as compared to the total side-lobe energy and power of the largest side lobe generated by the SIMO antenna 10 of FIGS. 1-2.

Still referring to FIG. 9, although the antenna section 90 is described as being a transmit antenna section, the antenna section 90 can also be used (e.g., also can operate) as a receive antenna section in the radar system 92 or in another system. Operation in a receive mode can be the same as described above for the transmit mode except that the antenna section 90 receives a signal, and provides the received signal to the radar-system circuitry via the RF feeds 26 (FIG. 2) and 94 (and via respective amplifiers 96 if included).

Figure 10:
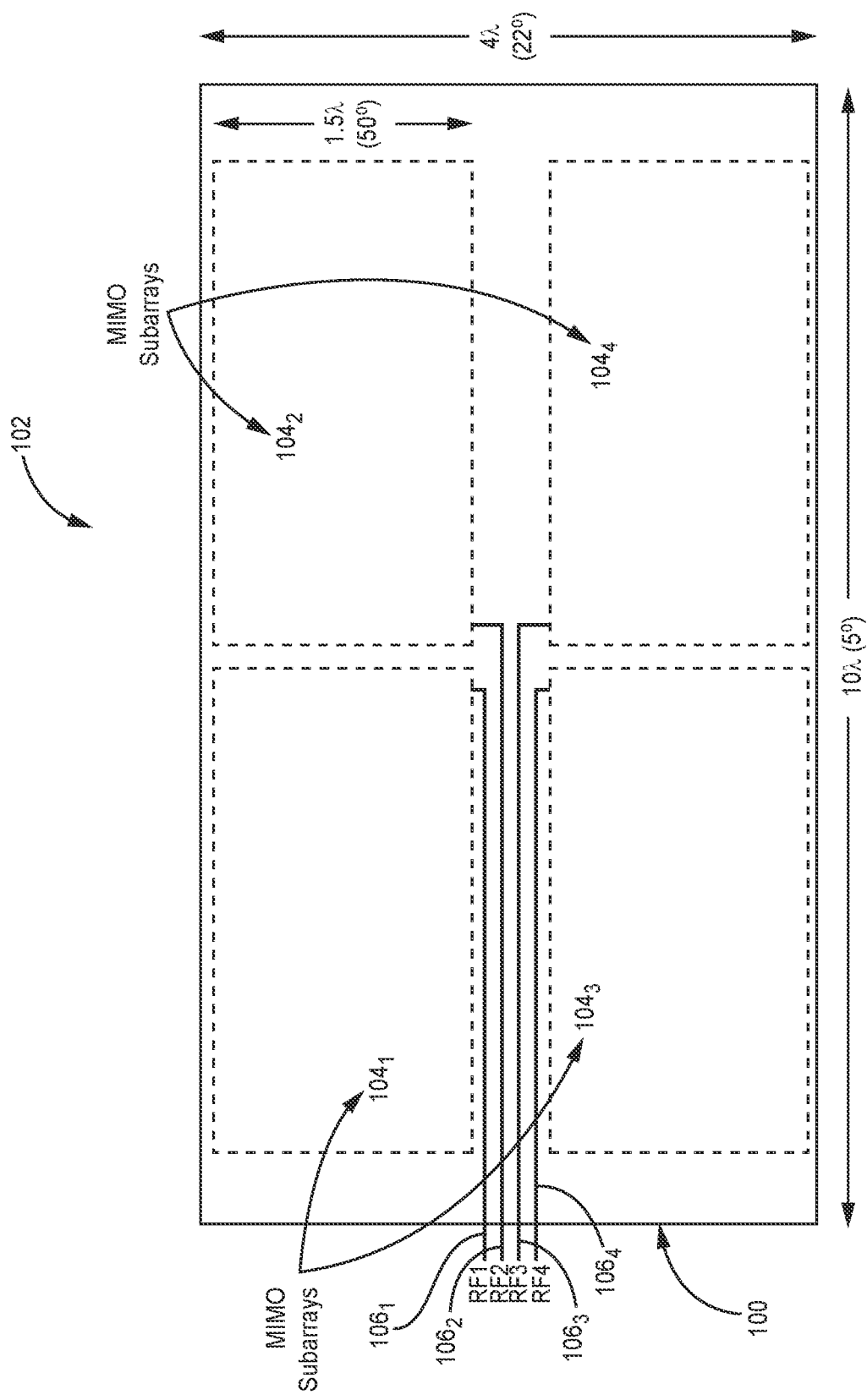
FIG. 10 is a diagram of a MIMO Multiple (here a 2×2) ESA antenna section, according to an embodiment.

FIG. 10 is a diagram of a MIMO Multiple (here a 2×2) ESA transmit antenna section 100 (such as a holographic antenna section) of a radar system 102, according to an embodiment. The section 100 includes multiple, here four, transmit antenna arrays $104_1$-$104_4$, each of which can be similar to the transmit antenna section 10 of FIGS. 1-2. The radar system 102 can include other components not shown in FIG. 10, such as amplifiers (e.g., amplifiers 96 of FIG. 9), phase shifters, and other drive circuitry that are omitted from FIG. 10. Furthermore, the transmit antenna section 100 may form an entire transmit antenna of the radar system 102, or only a section of the transmit antenna, which may include one or more other sections similar to the section 100.

Each array 104 is coupled to a respective RF feed $106_1$-$106_4$ via a respective amplifier (amplifier optional and not shown in FIG. 10); each RF feed 106 can be coupled to a respective RF feed 26 (FIG. 2), and, therefore, can be similar to the RF channel 14 of FIGS. 1-2.

In operation of the radar system 102 during a transmit mode, circuitry (not shown in FIG. 10) generates, and drives onto the RF feeds 106, respective RF signals that are approximately orthogonal to one another. In response to the orthogonal RF signals, the arrays $104_1$-$104_4$ generate respective transmit beams that are approximately orthogonal to one another. Orthogonal RF signals and transmit beams allow a receiver (not shown in FIG. 10) of the radar system 102 to distinguish which reflections come from which transmit beams, and, therefore, allow the receiver to increase the effective aperture of the receive antenna and the effective resolution of the receive beam (i.e., allows the receiver to decrease the effective width of the receive beam). Furthermore, the radar system 102 can use the transmit antenna section 100 as a receive antenna section.

The radar system 102 can cause the RF signals to be approximately orthogonal to one another in any suitable conventional manner. For example, the radar system 102 can impart to the RF signals different frequencies, different phases, different amplitudes, different coding, or different chirp profiles (e.g., one RF signal increases in frequency while another RF signal decreases in frequency) to provide or enhance orthogonality. In further example, the RF signals can have different frequencies that minimally overlap at the receiver. Therefore, the receiver can filter the received energy to isolate the received signals. Because in some applications, such as radar, a limited frequency band makes it difficult to render the RF signals orthogonal by setting them to different frequencies, other techniques, such as modulation or coding, can be used to render the RF signals approximately orthogonal to one another.

Furthermore, the radar system 102 is configured to steer the main transmit beams generated by the arrays 104 together such that main transmit beams are all at approximately the same scan angle simultaneously. In the far field, even though the main transmit beams are approximately parallel to one another when they leave the arrays 104, they do overlap and illuminate a same region of space. Because the RF signals, and thus the main transmit beams, are approximately orthogonal to one another, the receiver of the radar system 102 can determine the region of overlap of the main transmit beams on a beam-redirecting object. And because this region of overlap is typically smaller than the beam width of any single one of the main transmit beams at the object, the receiver effectively increases the resolution, and decreases the effective width, of the transmit beam that results from the combination of the main transmit beams generated by the arrays 104. Said another way, the arrays 104 cooperate to generate a resulting transmit beam having a relatively narrow effective width at least in the AZ dimension, and cooperate to generate the resulting transmit beam from component transmit beams (four component beams in an embodiment described in conjunction with FIG. 10) that are orthogonal to one another.

Still referring to FIG. 10, alternate embodiments of the transmit antenna section 100 are contemplated. For example, although shown as having four arrays 104 arranged in a square shape, the transmit antenna section 100 can have fewer or more than four arrays 104 arranged in any other suitable shape such as rectangular, linear in the vertical dimension, or linear in the horizontal dimension. Furthermore, one or more of the arrays 104 can have a different size or a different architecture than the other arrays. Moreover, although the antenna section 100 is described as being a transmit antenna section operating in a transmit mode, the antenna section 100 can also be operated as a receive antenna section in a receive mode of the radar system 102 or of another system. Operation in a receive mode can be the same as described above for the transmit mode except that the antenna section 100 receives a signal, and provides the received signal to the radar-system circuitry (not shown in FIG. 10) via the RF feeds 26 (FIG. 2) and the RF channels 106 (and via respective amplifiers if included).

Figure 11:
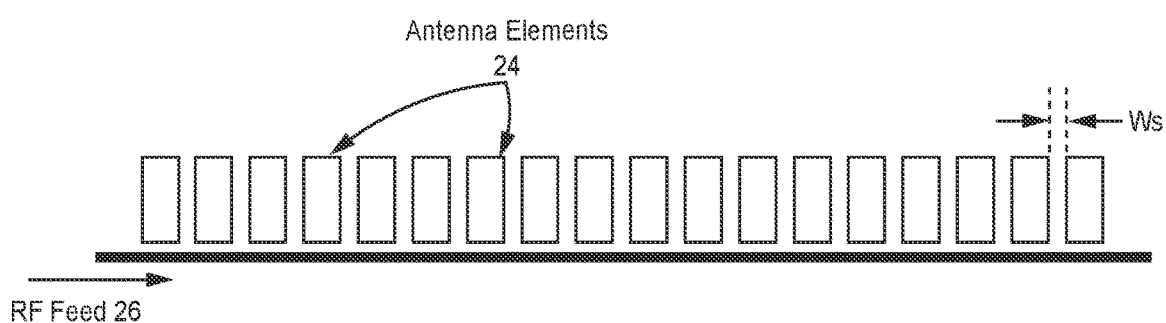
FIG. 11 is a diagram of antenna elements of the antenna array of FIG. 2 arranged in a rectangular-lattice pattern, according to an embodiment.

FIG. 11 is a diagram of the antenna elements 24 of the antenna cells 22 and the RF feed 26 of the antenna array 10 of FIG. 2 arranged in a rectangular-lattice pattern to reduce the levels of side lobes generated by the antenna array 10, according to an embodiment. In the rectangular-lattice pattern, the antenna elements 24 of the antenna cells 22 are closely (e.g., within $\lambda/10$) spaced from the RF feed 26, and are closely (e.g., within $\lambda/10$) spaced apart from each other. The reduction in the level of side lobes that the rectangular-lattice pattern provides is in addition to the reduction in the side-lobe level provided by the roll offs of the AZ and EL beam patterns 40 and 42 (FIG. 3) of each antenna cell 22 as described above in conjunction with FIGS. 3-5 and 7-8.

Figure 12:
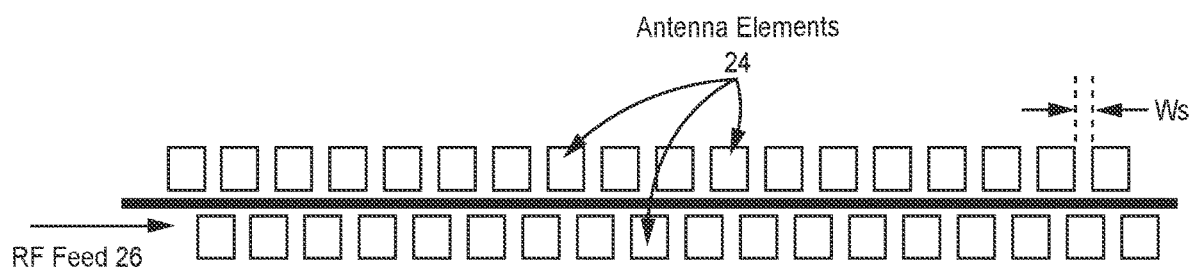
FIG. 12 is a diagram of antenna elements of the antenna array of FIG. 2 arranged in a triangular-lattice pattern, according to an embodiment.

FIG. 12 is a diagram of the antenna elements 24 of the antenna cells 22 and the RF feed 26 of an antenna array arranged in a triangular-lattice pattern to reduce the levels of side lobes generated by the antenna array, according to an embodiment. In the triangular-lattice pattern, at least the antenna elements 24 of the antenna cells 22 are disposed on both sides of, and are closely (e.g., within $\lambda/10$) spaced from, the RF feed 26, and are closely (e.g., within $\lambda/10$) spaced apart from each other. And at least the antenna elements 24 of the antenna cells 22 on one side of the RF feed 26 are offset from at least the antenna elements of the antenna cells on the other side of the RF feed in the dimension in which the row of antenna cells extends. For example, the offset can be between zero and a distance equal to the sum of the width ($W_{ac}$, FIG. 2) of an antenna cell 22 and the distance $W_s$ between adjacent antenna elements 24. The reduction in the levels of side lobes that the triangular-lattice pattern provides is in addition to the reduction in the side-lobe level provided by the roll offs of the AZ and EL beam patterns 40 and 42 (FIG. 3) of each antenna cell 22 as described above in conjunction with FIGS. 3-5 and 7-8. Furthermore, but for the antenna cells 22 being on two sides of the RF feed 26, an antenna array that includes the triangular-lattice pattern of antenna cells and RF feed can be similar to the antenna array 10 of FIG. 2.

Still referring to FIGS. 11-12, alternative embodiments of the antenna arrays are contemplated. For example, the antenna cells 22 and RF feed 26 can be arranged in any suitable pattern. Furthermore, any of the antenna sections and antennas described above in FIGS. 1-10 can be modified, if needed, such that the antenna cells 22 are arranged in a rectangular-lattice pattern or in a triangular-lattice pattern. Moreover, the antenna elements 24 (FIG. 2) of the antenna cells 22 can be arranged in a rectangular-lattice or triangular-lattice pattern while one or more other components of the antenna units are not so arranged.

Figure 13:
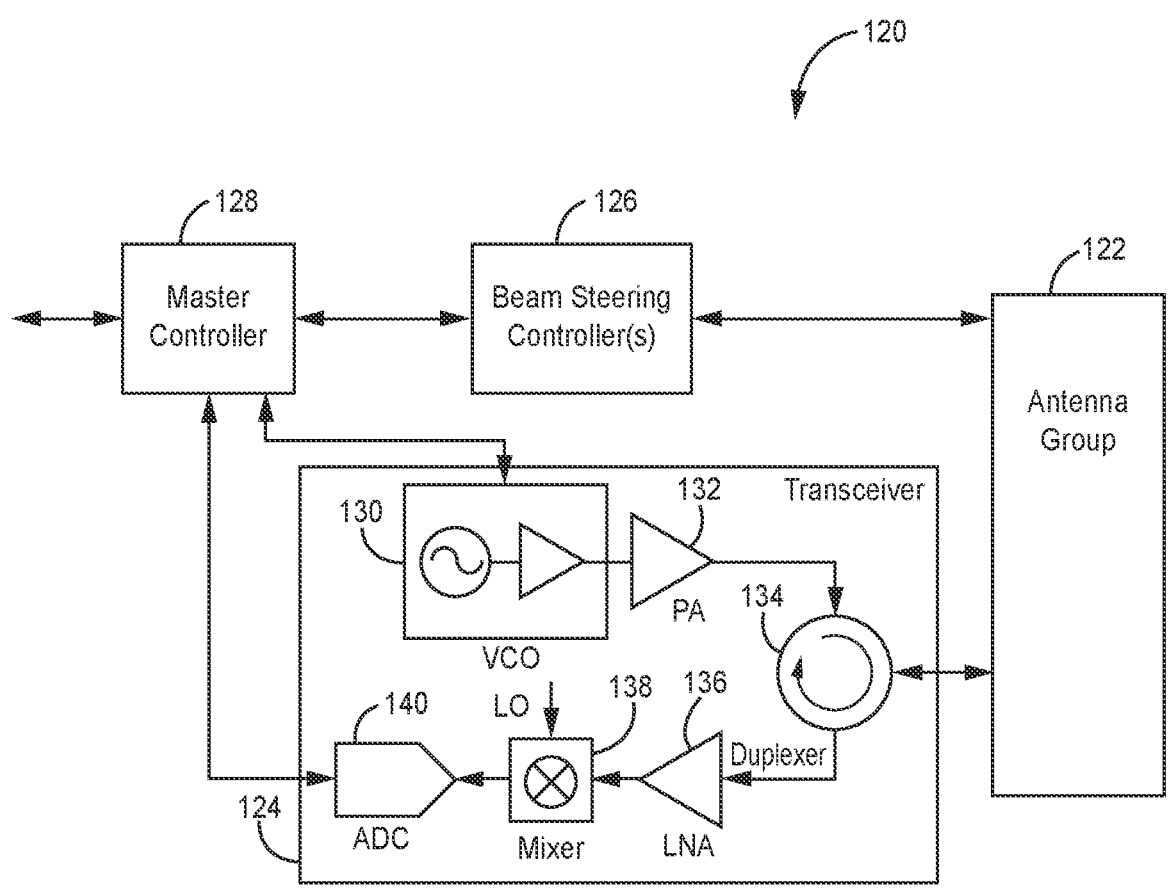
FIG. 13 is a block diagram of a radar subsystem, which incorporates one or more of the antennas described above in conjunction with FIGS. 1-12, according to an embodiment.

FIG. 13 is a block diagram of a radar subsystem 120, which includes an antenna group 122 having one or more of antennas, such as the antennas 10, 60, 92, and 102 described above in conjunction with FIGS. 1-12, the one or more antennas including one or more of the antenna units 22 described above in conjunction with FIGS. 2 and 12, according to an embodiment.

In addition to the antenna group 122, the radar subsystem 120 includes a transceiver 124, a beam-steering controller 126, and a master controller 128.

The transceiver 124 includes a voltage-controlled oscillator (VCO) 130, a preamplifier (PA) 132, a duplexer 134, a low-noise amplifier (LNA) 136, a mixer 138, and an analog-to-digital converter (ADC) 140. The VCO 130 is configured to generate a reference signal having a frequency $f_0 = c/\lambda_0$, which is the frequency for which at least one of the antennas of the antenna group 122 is configured. The PA 132 is configured to amplify the VCO signal, and the duplexer 134 is configured to couple the reference signal to the antennas of the antenna group 122, via one or more signal feeders (not shown in FIG. 13), as transmit versions of respective reference waves. One or both of the duplexer 134 and antenna group 132 can include one or more of the signal feeders. The duplexer 134 is also configured to receive receive versions of respective reference waves from the antennas of the antenna group 122, and to provide these receive versions of the respective reference waves to the LNA 136, which is configured to amplify these received signals. The mixer 138 is configured to shift the frequencies of the amplified received signals down to a base band, and the ADC 140 is configured to convert the down-shifted analog signals to digital signals for processing by the master controller 128.

The beam-steering controller 126 is configured to steer the beams (both transmit and receive beams) generated by the one or more antennas of the antenna group 122 by generating the control signals to the control ports of the antenna units as a function of time and main-beam position. By appropriately generating the control signals, the beam-steering controller 126 is configured to selectively activate, deactivate, and generate a phase shift for, the antenna elements of the antenna units according to selected spatial and temporal patterns.

The master controller 128 is configured to control the transceiver 124 and the beam-steering controller 126, and to analyze the digital signals from the ADC 140. For example, assuming that the one or more antennas of the antenna group 122 are designed to operate at frequencies in a range centered about $f_0$, the master controller 128 is configured to adjust the frequency of the signal generated by the VCO 130 for, e.g., environmental conditions such as weather, the average number of objects in the range of the one or more antennas of the antenna assembly, and the average distance of the objects from the one or more antennas, and to conform the signal to spectrum regulations. Furthermore, the master controller 128 is configured to analyze the signals from the ADC 140 to, e.g., identify a detected object, and to determine what action, if any, that a system including, or coupled to, the radar subsystem 120 should take. For example, if the system is a self-driving vehicle or a self-directed drone, then the master controller 128 is configured to determine what action (e.g., braking, swerving), if any, the vehicle should take in response to the detected object.

Operation of the radar subsystem 240 is described below, according to an embodiment. Any of the system components, such as the master controller 248, can store in a memory, and execute, software/program instructions to perform the below-described actions. Alternatively any of the system components, such as the system controller 248, can store, in a memory, firmware that when loaded configures one or more of the system components to perform the below-described actions. Or any of the system components, such as the system controller 128, can be hardwired to perform the below-described actions.

The master controller 128 generates a control voltage that causes the VCO 130 to generate a reference signal at a frequency within a frequency range centered about $f_0$. For example, $f_0$ can be in the range of approximately 5 Gigahertz (GHz)-110 GHz.

The VCO 130 generates the signal, and the PA 132 amplifies the signal and provides the amplified signal to the duplexer 134.

The duplexer 134 can further amplify the signal, and couples the amplified signal to the one or more antennas of the antenna group 122 as a respective transmit version of a reference wave.

While the duplexer 134 is coupling the signal to the one or more antennas of the antenna group 122, the beam-steering controller 126, in response to the master controller 128, is generating control signals to the antenna units of the one or more antennas. These control signals cause the one or more antennas to generate and to steer one or more main signal-transmission beams. The control signals cause the one or more main signal-transmission beams to have desired characteristics (e.g., phase, amplitude, polarization, direction, half-power beam width (HPBW)), and also cause the side lobes to have desired characteristics such as suitable total side-lobe power and a suitable side-lobe level (e.g., a difference between the magnitudes of a smallest main signal-transmission beam and the largest side lobe).

Then, the master controller 128 causes the VCO 130 to cease generating the reference signal.

Next, while the VCO 130 is generating no reference signal, the beam-steering controller 126, in response to the master controller 128, generates control signals to the antenna units of the one or more antennas. These control signals cause the one or more antennas to generate and to steer one or more main signal-receive beams. The control signals cause the one or more main signal-receive beams to have desired characteristics (e.g., phase, amplitude, polarization, direction, half-power beam width (HPBW)), and also cause the side lobes to have desired characteristics such as suitable total side-lobe power and a suitable side-lobe level. Furthermore, the beam-steering controller 126 can generate the same sequence of control signals for steering the one or more main signal-receive beams as it does for steering the one or more main signal-transmit beams.

Then, the duplexer 134 couples receive versions of reference waves respectively generated by the one or more antennas of the antenna subassembly 122 to the LNA 136.

Next, the LNA 132 amplifies the received signals.

Then, the mixer 138 down-converts the amplified received signals from a frequency, e.g., at or near $f_0$, to a baseband frequency.

Next, the ADC 140 converts the analog down-converted signals to digital signals.

Then, the master system controller 128 analyzes the digital signals to obtain information from the signals and to determine what, if anything, should be done in response to the information obtained from the signals.

The master system controller 128 can repeat the above cycle one or more times.

Still referring to FIG. 13, alternate embodiments of the radar subsystem 120 are contemplated. For example, the radar subsystem 120 can include one or more additional components not described above, and can omit one or more of the above-described components. Furthermore, embodiments described above in conjunction with FIGS. 1-12 and below in conjunction with FIG. 14 may apply to the radar subsystem 120.

Figure 14:
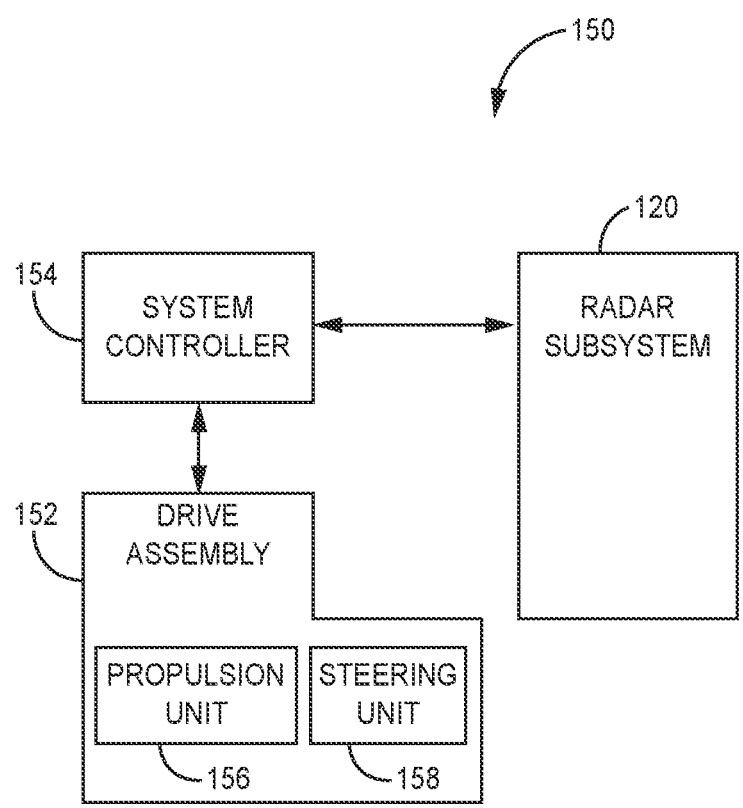
FIG. 14 is a block diagram of a system that includes the radar subsystem of FIG. 13, according to an embodiment.

FIG. 14 is a block diagram of a system, such as a vehicle system 150, which includes the radar subsystem 120 of FIG. 13, according to an embodiment. For example, the vehicle system 150 can be an unmanned aerial vehicle (UAV) such as a drone, or a self-directed (e.g., self-driving) car.

In addition to the radar subsystem 120, the vehicle system 150 includes a drive assembly 152 and a system controller 154.

The drive assembly 152 includes a propulsion unit 156, such as an engine or motor, and includes a steering unit 158, such as a rudder, flaperon, pitch control, or yaw control (for, e.g., an UAV or drone), or a steering wheel linked to steerable wheels (for, e.g., a self-directed car).

The system controller 154 is configured to control, and to receive information from, the radar subsystem 120 and the drive assembly 152. For example, the system controller 154 can be configured to receive locations, sizes, and speeds of nearby objects from the radar subsystem 120, and to receive the speed and traveling direction of the vehicle system 150 from the drive assembly 152.

Operation of the vehicle system 150 is described below, according to an embodiment. Any of the system components, such as the system controller 154, can be a circuit that is configured to store in a memory, and to execute, software/program instructions to perform the below-described actions. Alternatively, any of the system components, such as the system controller 154, can be a circuit that stores, in a memory, firmware that, when loaded, configures one or more of the system components to perform the below-described actions. Or any of the system components, such as the system controller 154, can be circuitry hardwired to perform the below-described actions.

The system controller 154 activates the radar subsystem 120, which, as described above in conjunction with FIG. 13, provides to the system controller information regarding one or more objects in the vicinity of the vehicle system 150. For example, if the vehicle system 150 is an UAV or a drone, then the radar subsystem can provide information regarding one or more objects (e.g., birds, aircraft, and other UAVs/drones), in the flight path to the front, sides, and rear of the UAV/drone. Alternatively, if the vehicle system 150 is a self-directed car, then the radar subsystem 120 can provide information regarding one or more objects (e.g., other vehicles, debris, pedestrians, bicyclists) in the roadway or out of the roadway to the front, sides, and rear of the vehicle system.

In response to the object information from the radar subsystem 120, the system controller 154 determines what action, if any, the vehicle system 150 should take in response to the object information. Alternatively, the master controller 128 (FIG. 13) of the radar subsystem 120 can make this determination and provide it to the system controller 154.

Next, if the system controller 154 (or master controller 128 of FIG. 13) determined that an action should be taken, then the system controller causes the drive assembly 152 to take the determined action. For example, if the system controller 154 or master controller 128 were to determine that a UAV system 150 is closing on an object in front of the UAV system, then the system controller 154 could control the propulsion unit 156 to reduce air speed. Or, if the system controller 154 or master controller 128 were to determine that an object in front of a self-driving system 150 is slowing down, then the system controller 154 could control the propulsion unit 156 to reduce engine speed and to apply a brake. Or if the system controller 154 or master controller 128 were to determine that evasive action is needed to avoid an object (e.g., another UAV/drone, a bird, a child who ran in front of the vehicle system) in front of the vehicle system 150, then the system controller 154 could control the propulsion unit 156 to reduce engine speed and, for a self-driving vehicle, to apply a brake, and could control the steering unit 158 to maneuver the vehicle system away from or around the object.

Still referring to FIG. 14, alternate embodiments of the vehicle system 150 are contemplated. For example, the vehicle system 150 can include one or more additional components not described above, and can omit one or more of the above-described components. Furthermore, the vehicle system 150 can be a vehicle system other than a UAV, drone, or self-driving car. Other examples of the vehicle system 150 include a watercraft, a motor cycle, a car that is not self-driving, and a spacecraft. Moreover, a system including the radar subsystem 120 can be other than a vehicle system. Furthermore, embodiments described above in conjunction with FIGS. 1-13 may apply to the vehicle system 150.

Example 1 includes an antenna, comprising: a first one-dimensional array of antenna cells each spaced from an adjacent antenna cell by less than one half a wavelength at which the antenna cells are configured to transmit and to receive, configured to generate an array beam that is narrower in a dimension than in an orthogonal dimension, and configured to steer the array beam in the dimension; a first signal feed; and first signal couplers each configured to couple a respective one of the antenna cells to the signal feed in response a respective control signal having an active level.

Example 2 includes the antenna of Example 1 wherein at least one of the antenna cells is configured to generate a cell beam that is narrower in the orthogonal dimension than in the dimension.

Example 3 includes the antenna of any of Examples 1-2 wherein at least one of the antenna cells includes: a geometrical center; and a phase center that is coincident with the geometrical center.

Example 4 includes the antenna of any of Examples 1-3 wherein at least one of the antenna cells includes: a geometrical center; and a phase center that is spaced from the geometrical center.

Example 5 includes the antenna of any of Examples 1-4, further comprising: a layer; and wherein at least one of the antenna cells includes a geometrical center disposed in the layer, and a phase center spaced from the layer.

Example 6 includes the antenna of any of Examples 1-5, further comprising: a layer; wherein at least a portion of the signal feed is disposed in the layer; and wherein each of the antenna cells includes one or more respective antenna elements disposed in the layer on a same side of the signal feed.

Example 7 includes the antenna of any of Examples 1-6, further comprising: a layer; wherein at least a portion of the signal feed is disposed in the layer; wherein each of one or more of the antenna cells includes one or more respective antenna elements disposed in the layer on a one side of the signal feed; and wherein each of a remaining one or more antenna cells includes one or more respective antenna elements disposed in the layer on another side of the signal feed.

Example 8 includes the antenna of any of Examples 1-7, further comprising: a layer; wherein at least a portion of the signal feed is disposed in the layer; wherein each of every other one of the antenna cells includes one or more respective antenna elements disposed in the layer on a side of the signal feed; and wherein each of a remaining one or more antenna cells includes one or more respective antenna elements disposed in the layer on another side of the signal feed, each of the remaining one or more antenna cells offset from adjacent ones of the every other one of the antenna cells in a dimension along which the antenna cells are arranged.

Example 9 includes the antenna of any of Examples 1-8, further comprising: a second one-dimensional array of antenna cells; a second signal feed; and second signal couplers each configured to couple a respective one of the antenna cells of the second array to the second signal feed in response a respective control signal having an active level.

Example 10 includes the antenna of Example 9, further comprising a common channel configured to couple a common reference wave to both the first and second signal feeds.

Example 11 includes the antenna of any of Examples 9-10 wherein the second one-dimensional array of antenna cells is approximately parallel to the first one-dimensional array of antenna cells.

Example 12 includes the antenna of any of Examples 9-11 herein the second one-dimensional array of antenna cells is approximately collinear to the first one-dimensional array of antenna cells.

Example 13 includes the antenna of any of Examples 9-12 wherein the second one-dimensional array of antenna cells is stacked with the first one-dimensional array of antenna cells.

Example 14 includes the antenna of any of Examples 9-13 wherein the second one-dimensional array of antenna cells is stacked with, and offset from, the first one-dimensional array of antenna cells.

Example 15 includes the antenna of any of Examples 9-14 wherein the second one-dimensional array is spaced from the first one-dimensional array in a dimension approximately perpendicular to one of the arrays by a distance of at least approximately one half of the wavelength.

Example 16 includes a subsystem, comprising: an antenna including a first one-dimensional array of antenna cells each spaced from an adjacent antenna cell by less than one half a wavelength at which the antenna cells are configured to transmit and to receive, a first signal feed, and first signal couplers each configured to couple a respective one of the antenna cells to the first signal feed in response to a respective control signal having an active level; a transceiver configured to generate, on the first signal feed, a first transmit reference signal; and a beam-steering controller configured to generate the control signals to cause the first array of antenna cells to generate, in response to the first transmit reference signal, a transmit beam that is narrower in a dimension than in an orthogonal dimension, and to steer the transmit beam in the dimension.

Example 17 includes the subsystem of Example 16, further comprising: wherein the beam-steering controller is configured to generate the control signals to cause the first array of antenna cells to generate a receive beam that is narrower in the dimension than in the orthogonal dimension, and to steer the receive beam in the dimension; wherein the antenna is configured to generate a first receive reference signal on the first signal feed in response to the receive beam; wherein the transceiver is configured to receive, on the first signal feed, the first receive reference signal, and to process the first receive reference signal; and a controller circuit configured to detect an object in a field of view of the antenna response to the processed first receive reference signal from the transceiver and a direction of the receive beam.

Example 18 includes the subsystem of any of Examples 16-17 wherein: the antenna further comprises, a second one-dimensional array of antenna cells, a second signal feed, and second signal couplers each configured to couple a respective one of the antenna cells of the second array to the second signal feed in response a respective control signal having an active level; wherein the transceiver is configured to generate, on the second signal feed, the first transmit reference signal; and wherein the beam-steering controller is configured to generate the control signals to cause the first and second arrays of antenna cells to generate, in response to the first transmit reference signal, a transmit beam that is narrower in a dimension than in an orthogonal dimension, and to steer the transmit beam in the dimension.

Example 19 includes the subsystem of any of Examples 16-18 wherein: the antenna further comprises, a second one-dimensional array of antenna cells, a second signal feed, and second signal couplers each configured to couple a respective one of the antenna cells of the second array to the second signal feed in response a respective control signal having an active level; wherein the transceiver is configured to generate, on the second signal feed, a second transmit reference signal that is different than the first transmit reference signal; and wherein the beam-steering controller is configured to generate the control signals to cause the second array of antenna cells to generate, in response to the second transmit reference signal, a second transmit beam that is narrower in a dimension than in an orthogonal dimension, and to steer the second transmit beam in the dimension.

Example 20 includes the subsystem of Example 19, further comprising: wherein the beam-steering controller is configured to generate the control signals to cause the first and second arrays of antenna cells to generate, respectively, first and second receive beams that are each narrower in the dimension than in the orthogonal dimension, and to steer the first and second receive beams in the dimension; wherein the antenna is configured to generate a first receive reference signal on the first signal feed and a second receive reference signal on the second signal feed in response to the first and second receive beams; wherein the transceiver is configured to receive, on the first signal feed, the first receive reference signal, to receive, on the second signal feed, the second receive reference signal, and to process the first and second receive reference signals; and a controller circuit configured to detect an object in a field of view of the antenna in response to the processed first and second receive reference signals from the transceiver and respective directions of the first and second receive beams.

Example 21 includes the subsystem of Example 20 wherein the first and second transmit reference signals are approximately orthogonal to one another.

Example 22 includes the subsystem of any of Examples 20-21 wherein the direction of the first receive beam is approximately the same as the direction of the second receive beam.

Example 23 includes a system, comprising: a vehicle; a drive assembly disposed on the vehicle; a system controller disposed on the vehicle; and a radar subsystem disposed on the vehicle and coupled to the system controller, the radar subsystem including an antenna including a one-dimensional array of antenna cells each spaced from an adjacent antenna cell by less than one half a wavelength at which the antenna cells are configured to transmit and to receive, a signal feed, and signal couplers each configured to couple a respective one of the antenna cells to the signal feed in response to a respective control signal having an active level; a transceiver configured to generate, on the signal feed, a transmit reference signal; and a beam-steering controller configured to generate the control signals to cause the array of antenna cells to generate, in response to the first transmit reference signal, a transmit beam that is narrower in a dimension than in an orthogonal dimension, and to steer the transmit beam in the dimension.

Example 24 includes the system of Example 23, wherein the radar subsystem further comprises: wherein the beam-steering controller is configured to generate the control signals to cause the array of antenna cells to generate a receive beam that is narrower in the dimension than in the orthogonal dimension, and to steer the receive beam in the dimension; wherein the antenna is configured to generate a receive reference signal on the signal feed in response to the receive beam; wherein the transceiver is configured to receive, on the signal feed, the receive reference signal, and to process the receive reference signal; and a controller circuit configured to detect an object in a field of view of the antenna response to the processed receive reference signal from the transceiver and a direction of the receive beam.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated. In addition, a described component or operation may be implemented/performed in hardware, in a circuit that executes software, in a circuit that is configured with firmware, or a combination of any two or more of hardware, circuit that executes software, and circuit that is configured with firmware. Furthermore, one or more components of a described apparatus or system may have been omitted from the description for clarity or another reason. Moreover, one or more components of a described apparatus or system that have been included in the description may be omitted from the apparatus or system.

The invention claimed is:

1. An antenna, comprising:
    a single conductive layer,
    a first one-dimensional array of antenna cells
        each having at least a respective portion disposed in the single conductive layer,
        each spaced from an adjacent antenna cell by less than one half a wavelength at which the antenna cells are configured to transmit and to receive,
        configured to generate an array beam that is narrower in a dimension than in an orthogonal dimension, and
        configured to steer the array beam in the dimension;
    a first signal feed having at least a portion disposed in the single conductive layer; and
    first signal couplers each having a least a respective portion disposed in the single conductive layer and each configured to couple a respective one of the antenna cells to the signal feed in response a respective control signal having an active level.

2. The antenna of claim 1 wherein at least one of the antenna cells is configured to generate a cell beam that is narrower in the orthogonal dimension than in the dimension.

3. The antenna of claim 1 wherein at least one of the antenna cells includes:
   a geometrical center; and
   a phase center that is coincident with the geometrical center.

4. The antenna of claim 1 wherein at least one of the antenna cells includes:
   a geometrical center; and
   a phase center that is spaced from the geometrical center.

5. The antenna of claim 1
   wherein at least one of the antenna cells includes:
   a geometrical center disposed in the single conductive layer, and
   a phase center spaced from the single conductive layer.

6. The antenna of claim 1 wherein
   each of the antenna cells includes one or more respective antenna elements disposed in the single conductive layer on a same side of the signal feed.

7. The antenna of claim 6 wherein the respective antenna elements of each of the antenna cells are arranged in a respective one-dimensional array.

8. The antenna of claim 1 wherein:
   each of one or more of the antenna cells includes one or more respective antenna elements disposed in the single conductive layer on one side of the signal feed; and
   each of a remaining one or more antenna cells includes one or more respective antenna elements disposed in the single conductive layer on another side of the signal feed.

9. The antenna of claim 8 wherein the respective antenna elements of each of the antenna cells are arranged in a respective one-dimensional array along the dimension.

10. The antenna of claim 1 wherein:
    each of every other one of the antenna cells includes one or more respective antenna elements disposed in the single conductive layer on a side of the signal feed; and
    each of a remaining one or more antenna cells includes one or more respective antenna elements disposed in the single conductive layer on another side of the signal feed, each of the remaining one or more antenna cells offset from adjacent ones of the every other one of the antenna cells in a dimension along which the antenna cells are arranged.

11. The antenna of claim 1, further comprising:
    a second one-dimensional array of antenna cells;
    a second signal feed; and
    second signal couplers each configured to couple a respective one of the antenna cells of the second array to the second signal feed in response a respective control signal having an active level.

12. The antenna of claim 11, further comprising a common channel configured to couple a common reference wave to both the first and second signal feeds.

13. The antenna of claim 11 wherein the second one-dimensional array of antenna cells is approximately parallel to the first one-dimensional array of antenna cells.

14. The antenna of claim 11 wherein the second one-dimensional array of antenna cells is approximately collinear to the first one-dimensional array of antenna cells.

15. The antenna of claim 11 wherein the second one-dimensional array of antenna cells is stacked with the first one-dimensional array of antenna cells.

16. The antenna of claim 11 wherein the second one-dimensional array of antenna cells is stacked with, and offset from, the first one-dimensional array of antenna cells.

17. The antenna of claim 11 wherein the second one-dimensional array is spaced from the first one-dimensional array in a dimension approximately perpendicular to one of the arrays by a distance of at least approximately one half of the wavelength.

18. A subsystem, comprising:
    an antenna including
       a single conductive layer,
       a first one-dimensional array of antenna cells each having at least a respective portion disposed in the single conductive layer and spaced from an adjacent antenna cell by less than one half a wavelength at which the antenna cells are configured to transmit and to receive,
       a first signal feed having at least a portion disposed in the single conductive layer, and
       first signal couplers each having at least a respective portion disposed in the single conductive layer and each configured to couple a respective one of the antenna cells to the first signal feed in response to a respective control signal having an active level;
    a transceiver configured to generate, on the first signal feed, a first transmit reference signal; and
    a beam-steering controller configured to generate the control signals to cause the first array of antenna cells
       to generate, in response to the first transmit reference signal, a transmit beam that is narrower in a dimension than in an orthogonal dimension, and
       to steer the transmit beam in the dimension.

19. The subsystem of claim 18, further comprising:
    wherein the beam-steering controller is configured to generate the control signals to cause the first array of antenna cells
       to generate a receive beam that is narrower in the dimension than in the orthogonal dimension, and
       to steer the receive beam in the dimension;
    wherein the antenna is configured to generate a first receive reference signal on the first signal feed in response to the receive beam;
    wherein the transceiver is configured
       to receive, on the first signal feed, the first receive reference signal, and
       to process the first receive reference signal; and
    a controller circuit configured to detect an object in a field of view of the antenna response to the processed first receive reference signal from the transceiver and a direction of the receive beam.

20. The subsystem of claim 18 wherein:
    the antenna further comprises,
       a second one-dimensional array of antenna cells,
       a second signal feed, and
       second signal couplers each configured to couple a respective one of the antenna cells of the second array to the second signal feed in response a respective control signal having an active level;
    wherein the transceiver is configured to generate, on the second signal feed, the first transmit reference signal; and
    wherein the beam-steering controller is configured to generate the control signals to cause the first and second arrays of antenna cells to generate, in response to the first transmit reference signal, a transmit beam that is narrower in a dimension than in an orthogonal dimension, and to steer the transmit beam in the dimension.

21. The subsystem of claim 18 wherein:

the antenna further comprises, a second one-dimensional array of antenna cells, a second signal feed, and second signal couplers each configured to couple a respective one of the antenna cells of the second array to the second signal feed in response a respective control signal having an active level;

wherein the transceiver is configured to generate, on the second signal feed, a second transmit reference signal that is different than the first transmit reference signal; and wherein the beam-steering controller is configured to generate the control signals to cause the second array of antenna cells to generate, in response to the second transmit reference signal, a second transmit beam that is narrower in a dimension than in an orthogonal dimension, and to steer the second transmit beam in the dimension.

22. The subsystem of claim 21, further comprising:

wherein the beam-steering controller is configured to generate the control signals to cause the first and second arrays of antenna cells to generate, respectively, first and second receive beams that are each narrower in the dimension than in the orthogonal dimension, and to steer the first and second receive beams in the dimension;

wherein the antenna is configured to generate a first receive reference signal on the first signal feed and a second receive reference signal on the second signal feed in response to the first and second receive beams;

wherein the transceiver is configured to receive, on the first signal feed, the first receive reference signal, to receive, on the second signal feed, the second receive reference signal, and to process the first and second receive reference signals; and a controller circuit configured to detect an object in a field of view of the antenna in response to the processed first and second receive reference signals from the transceiver and respective directions of the first and second receive beams.

23. The subsystem of claim 22 wherein the first and second transmit reference signals are approximately orthogonal to one another.

24. The subsystem of claim 22 wherein the direction of the first receive beam is approximately the same as the direction of the second receive beam.

25. A system, comprising:

a vehicle;

a drive assembly disposed on the vehicle;

a system controller disposed on the vehicle; and a radar subsystem disposed on the vehicle and coupled to the system controller, the radar subsystem including an antenna including a single conductive layer, a one-dimensional array of antenna cells each having at least a respective portion disposed in the single conductive layer and spaced from an adjacent antenna cell by less than one half a wavelength at which the antenna cells are configured to transmit and to receive, a signal feed having at least a portion disposed in the single conductive layer, and signal couplers of each having at least a respective portion disposed in the single conductive layer and each configured to couple a respective one of the antenna cells to the signal feed in response to a respective control signal having an active level;

a transceiver configured to generate, on the signal feed, a transmit reference signal; and a beam-steering controller configured to generate the control signals to cause the array of antenna cells to generate, in response to the first transmit reference signal, a transmit beam that is narrower in a dimension than in an orthogonal dimension, and to steer the transmit beam in the dimension.

26. The system of claim 25, wherein the radar subsystem further comprises:

wherein the beam-steering controller is configured to generate the control signals to cause the array of antenna cells to generate a receive beam that is narrower in the dimension than in the orthogonal dimension, and to steer the receive beam in the dimension;

wherein the antenna is configured to generate a receive reference signal on the signal feed in response to the receive beam;

wherein the transceiver is configured to receive, on the signal feed, the receive reference signal, and to process the receive reference signal; and a controller circuit configured to detect an object in a field of view of the antenna response to the processed receive reference signal from the transceiver and a direction of the receive beam.

* * * * *